US012424810B1

United States Patent
Lee et al.

(10) Patent No.: US 12,424,810 B1
(45) Date of Patent: Sep. 23, 2025

(54) COMPACT ATOM INTERFEROMETRY INERTIAL NAVIGATION SENSORS WITH TAILORED DIFFRACTIVE OPTICS

(71) Applicant: National Technology & Engineering Solutions of Sandia, LLC, Albuquerque, NM (US)

(72) Inventors: Jongmin Lee, Albuquerque, NM (US); Grant Biedermann, Norman, OK (US); Hayden James Evans McGuinness, Albuquerque, NM (US); Peter Schwindt, Albuquerque, NM (US); Shanalyn A. Kemme, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 958 days.

(21) Appl. No.: 17/546,336

(22) Filed: Dec. 9, 2021

Related U.S. Application Data

(60) Provisional application No. 63/139,359, filed on Jan. 20, 2021.

(51) Int. Cl.
*G01C 19/58* (2006.01)
*G01P 15/093* (2006.01)
(Continued)

(52) U.S. Cl.
CPC ............ *H01S 3/0071* (2013.01); *G01C 19/58* (2013.01); *G01P 15/093* (2013.01); *G01V 7/04* (2013.01);
(Continued)

(58) Field of Classification Search
CPC ................. H01S 3/0071; H01S 3/0401; H01S 3/094046; H01S 3/10061; G01C 19/58;
(Continued)

(56) References Cited

U.S. PATENT DOCUMENTS

2017/0372808 A1\* 12/2017 Gill .................... G01B 9/02015
2018/0066942 A1\* 3/2018 Compton ............... G01C 19/64

OTHER PUBLICATIONS

J. Lee et al., "Sub-Doppler cooling of neutral atoms in a grating magneto-optical trap," J. Opt. Soc. Am. B 30, 2869-2874 (2013) (Year: 2013).\*

(Continued)

*Primary Examiner* — Xinning(Tom) Niu
(74) *Attorney, Agent, or Firm* — Mark A. Dodd

(57) ABSTRACT

Various optical systems for use in a light pulse atomic interferometer (LPAI)-based one-, two-, or three-axis accelerometer or gyroscope are disclosed. As an LPAI accelerometer or gyroscope may employ many different laser beams to implement the LPAI functionality, ways of combining these different laser beams to thereby simplify the optical systems are desired. The cooling laser beam portion of the optical system may be simplified using one or more reflective grating chips. The Raman laser beam optics may be simplified using combiners and separators. For LPAI systems sensing along three axes, various optical switching schemes may be employed, including ones that generate variable data-rates with a primary sensing axis having a higher data-rate than the secondary sensing axes. Further, by combining various laser beams in a time-multiplexed manner, the number of optical fiber tethers to a sensor head may be reduced.

20 Claims, 16 Drawing Sheets

(51) Int. Cl.
*G01V 7/04* (2006.01)
*G21K 1/00* (2006.01)
*H01S 3/00* (2006.01)
*H01S 3/04* (2006.01)
*H01S 3/094* (2006.01)
*H01S 3/10* (2006.01)
*G01P 15/18* (2013.01)

(52) U.S. Cl.
CPC ............ G21K 1/006 (2013.01); H01S 3/0401 (2013.01); H01S 3/094046 (2013.01); H01S 3/10061 (2013.01); *G01P 15/18* (2013.01)

(58) Field of Classification Search
CPC ......... G01P 15/093; G01P 15/18; G01V 7/04; G21K 1/006
See application file for complete search history.

(56) References Cited

OTHER PUBLICATIONS

Perrin et al., "Zero-velocity atom interferometry using a retroreflected frequency-chirped laser," Phys. Rev. A 100, 053618 (2019) (Year: 2019).*

8. T. Müller et al., "A compact dual atom interferometer gyroscope based on laser-cooled rubidium." Eur. Phys. J. D 53, 273-281 (2009) (Year: 2009).*

Biedermann, G. W. et al., "Testing gravity with cold-atom interferometers," Physical Review A (2015) 91:033629, 10 pages.

Fixler, J. B. et al., "Atom Interferometer Measurement of the Newtonian Constant of Gravity," Science (2007) 315:74-77.

Kasevich, M. et al., "Laser Cooling below a Photon Recoil with Three-Level Atoms," Physical Review Letters (1992) 69(12):1741-1744.

Kerman, A. J. et al., "Beyond Optical Molasses: 3D Raman Sideband Cooling of Atomic Cesium to High Phase-Space Density," Physical Review Letters (2000) 84(3):439-442.

Mcgilligan, J. P. et al., "Laser cooling in a chip-scale platform," Applied Physics Letters (2020) 117:054001, 4 pages.

Mcguiness, H. J. et al., "High data-rate atom interferometer for measuring acceleration," Applied Physics Letters (2012) 100:011106, 4 pages.

Mcguirk, J. M. et al., "Sensitive absolute-gravity gradiometry using atom interferometry," Physical Review A (2002) 65:033608, 14 pages.

Vuletic, V. et al., "Degenerate Raman Sideband Cooling of Trapped Cesium Atoms at Very High Atomic Densities," Physical Review Letters (1998) 81(26):5768-5771.

* cited by examiner

COMPACT ATOM INTERFEROMETRY INERTIAL NAVIGATION SENSORS WITH TAILORED DIFFRACTIVE OPTICS

RELATED APPLICATIONS

This application claims priority to U.S. Provisional Application No. 63/139,359 filed on Jan. 20, 2021, and entitled COMPACT ATOM INTERFEROMETRY INERTIAL NAVIGATION SENSORS WITH TAILORED DIFFRACTIVE OPTICS, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to a diffractive optical system designed for use in atom interferometry-based navigation sensors, include gravimeters, accelerometers, gyroscopes, and gravity gradiometers.

BACKGROUND

High-precision positioning, navigation, and timing (PNT) sensors are attractive for advanced positional awareness in global positioning system (GPS) denied and radio frequency (RF) contested environments. Cold atom sensors have achieved state-of-the-art records for sensitivities and accuracies in gravimeters, accelerometers, gyroscopes, gravity gradiometers, clocks, magnetometers, and electrometers that are comparable to the best classical sensors. The development of compact, deployable cold atom interferometers (AIs) for inertial navigation is a significant long-term goal in the industry. Cold atom sensor platforms having a compact size, low weight, and low power are of interest for operating sensors in dynamic environments.

The sensor head employed in a compact atom interferometry-based sensor platform includes a magneto-optical trap (MOT) to generate the atomic cloud used in the AI process. Traditionally, six laser cooling beams and a repump beam are coupled to the sensor head using optical fibers to generate Doppler-cooled atoms in a MOT under a magnetic field gradient using a pair of anti-Helmholtz coils. Through a sub-Doppler cooling process (for example, by lowering the cooling beams' intensity, increasing the cooling beams' detuning, and zeroing the magnetic field gradient), the atoms can be further cooled to an average atom temperature of 15 μK or less. These laser-cooled atoms are subjected to the AI, and the AI process typically requires two counter-propagating, Doppler-sensitive Raman laser beams that coherently address the transition between two ground states of the atom and provides the state-dependent momentum kicks, i.e., photon recoils, on a ground state of the atoms. The three light-pulse sequence ($\pi/2 \rightarrow \pi \rightarrow \pi/2$) of the Raman laser beams in the AI process splits, redirects, and combines two matterwave packets to create atomic interference effects for measuring acceleration (in time and one-dimensional (1D) space) or angular velocity (in time and two-dimensional (2D) space). At the end of the AI process, a detection laser beam is employed to detect these interference effects based on the atomic populations of the two ground states. Thus, the sensor head may need to accurately align as many as ten different laser beams to successfully create, interact with, and measure the atomic cloud—a daunting task. See H. J. McGuinness et al., "High data-rate interferometer for measuring accelerating," Applied Physics Letters, vol. 100, art. no. 011106 (2012), the contents of which are incorporated herein by reference. Note that this total of ten beams is for a gravimeter, in which atomic clouds free-fall under gravity; a total of eleven beams is required for an accelerometer, in which atomic clouds are launched along the direction of acceleration with an additional launching beam. The number of required beams may double for an AI-based gyroscope as two separate atomic clouds are launched in opposite directions to simultaneously measure clockwise and counter-clockwise rotations about the sensing axis. The number of required beams may also double for an AI-based gravity gradiometer as two horizontally or vertically separate atomic clouds are launched against gravity to configure two atomic fountains, though they share the same Raman laser beams for measuring horizontal or vertical gravity gradient, respectively.

Atom interferometers have been demonstrated as high performance, high precision accelerometers, gravimeters, gravity gradiometers, and gyroscopes in the laboratory. Laboratory AI systems are physically large and typically employ full optical tables to generate multiple laser sources with control electronics. These laboratory AI systems need to be simplified and made more compact to be of practical use in dynamic environments. Beyond the laboratory, those efforts will lead to a compact matterwave inertial measurement unit (IMU) composed of three AI accelerometers and three AI gyroscopes. Therefore, it is important to reduce the size, weight, and power of these laboratory-demonstrated AI sensors if they are to be used in practical navigation systems.

Thus, a need exists for a compact and simplified optical design of an AI-based sensor head that reduces the number of required input laser beams and thereby simplifies the alignment of the laser beams needed to create, interact with, and measure an atomic cloud for an accelerometer and a pair of atomic clouds for a gyroscope.

SUMMARY

Various aspects of the present invention relate to optical systems for use in a light pulse atomic interferometer (LPAI)-based one-, two-, or three-axis accelerometers or gyroscopes. As an LPAI accelerometer or gyroscope may employ many different laser beams to implement the LPAI functionality, various embodiments combine these different laser beams to simplify the optical systems. The cooling laser beam portion of the optical system may be simplified using one or more reflective grating chips. The Raman laser beam optics may be simplified using combiners and separators. For LPAI systems sensing in three axes, various optical switching schemes may be employed, including ones that generate variable data-rates with a primary sensing axis having a higher data-rate than the secondary sensing axes. Further, by combining various laser beams in a time-multiplexed manner, the number of optical fiber tethers to a sensor head may be reduced.

In a linear class of embodiments, an optical system comprises laser cooling beam optics (the laser cooling beam optics receiving a laser cooling beam and to generate at least one laser cooling sub-beam, the laser cooling beam optics including at least one reflective grating chip, the laser cooling beam optics directing each laser cooling sub-beam toward a corresponding reflective grating chip, each reflective grating chip diffracting a corresponding laser cooling sub-beam into a corresponding plurality of diffracted laser cooling beams, Raman combining optics (the Raman combining optics receiving a pair of Raman laser beams and combining the pair of Raman laser beams, thereby forming a combined pair of cross-polarized Raman laser beams), Raman separating optics (the Raman separating optics receiving the combined pair of cross-polarized Raman laser beams and separating the combined pair of cross-polarized Raman laser beams into at least one pair of first and second Raman laser beams according to optical polarization), and at least one Raman redirector element (each Raman redirector element receiving a corresponding pair of first and second Raman laser beams and directing a corresponding pair of first and second Raman laser beams such that a corresponding pair of first and second Raman laser beams are overlapping and counter-propagating through a corresponding atomic cloud).

In various linear embodiments, the laser cooling beam optics includes at least one beamsplitter (the at least one beamsplitter receiving the laser cooling beam and separating the laser cooling beam into at least two laser cooling sub-beams, the laser cooling beam optics directing each laser cooling sub-beam to a corresponding reflective grating chip); the laser cooling beam optics includes at least one optical demultiplexer switch (the at least one optical demultiplexer switch receiving the laser cooling beam and separating the laser cooling beam into at least two laser cooling sub-beams in a time-multiplexed manner, the laser cooling beam optics directing a respective one of the at least two laser cooling sub-beams to a corresponding one of the one or more reflective grating chips in a time-multiplexed manner); and the Raman combining optics include a polarizing beam splitter (the polarizing beam splitter receiving the pair of Raman laser beams and combining the pair of Raman lasers beams to thereby form the combined pair of cross-polarized Raman laser beams), a Raman laser beam switch (the Raman laser beam switch receiving the combined pair of cross-polarized Raman laser beams and simultaneously switching the combined pair of cross-polarized Raman laser beams to thereby form a sequence of three Raman pulses, pulses in the sequence of three Raman pulses splitting, redirecting, and re-combining atomic wavepackets of the atomic cloud, respectively), and a Raman laser beam output port (the Raman laser beam output port receiving the thus switched combined pair of cross-polarized Raman laser beams and directing the thus switched combined pair of cross-polarized Raman laser beams to the Raman separating optics).

In other linear embodiments, the Raman separating optics include a first polarizing beam splitter (the first polarizing beam splitter receiving and separating the combined pair of cross-polarized Raman laser beams into the pair of first and second Raman laser beams according to optical polarization, the first polarizing beam splitter directing the second Raman laser beam to the Raman directing optics and redirecting the first Raman laser beam) and a second polarizing beam splitter (the second polarizing beam splitter receiving and redirecting the first Raman laser beam); the Raman separating optics include a beamsplitter or an optical demultiplexer switch (the beamsplitter or the optical demultiplexer switch receiving the combined pair of cross-polarized Raman laser beams and separating the combined pair of cross-polarized Raman laser beams into at least two sets of combined pairs of cross-polarized Raman laser beams for multi-axis sensing), the Raman separating optics directing each set of combined pairs of cross-polarized Raman laser beams such that a direction of each set of combined pairs of cross-polarized Raman laser beams is orthogonal to a direction of each other of the sets of combined pairs of cross-polarized Raman laser beams for multi-axis sensing; and the optical demultiplexer switch generating the at least two sets of combined pairs of cross-polarized Raman laser beams in a time-multiplexed manner.

In yet other linear embodiments, the Raman combining optics receive a launching beam, the Raman separating optics further include launching beam optics (the launching beam optics receiving the launching beam, separating the launching beam into at least one launching sub-beam, and directing each launching sub-beam such that a direction of the launching sub-beam is parallel to a direction of a corresponding pair of first and second Raman laser beams, each launching sub-beam delivering an initial momentum to atoms in a corresponding atomic cloud), and the optical system implements one of an accelerometer, a gravimeter in an atomic fountain configuration, or a gravity gradiometer in an atomic fountain configuration; the launching beam optics include at least one optical demultiplexer switch (the at least one optical demultiplexer switch receiving the launching beam and separating the launching beam into at least two launching sub-beams in a time-multiplexed manner); and the optical system implement one of an accelerometer, a gravimeter, or a gravity gradiometer with one of a single sensing axis, two sensing axes, or three sensing axes.

In a rotational class of embodiments, an optical system comprises laser cooling beam optics (the laser cooling beam optics receiving a laser cooling beam and generating at least two laser cooling sub-beams, the laser cooling beam optics including at least two reflective grating chips (the at least two reflective grating chips lying in a common plane, the laser cooling beam optics directing each laser cooling sub-beam toward a corresponding reflective grating chip, each reflective grating chip diffracting a corresponding laser cooling sub-beam into a corresponding plurality of diffracted laser cooling beams)), Raman combining optics (the Raman combining optics receiving a pair of Raman laser beams and combining the pair of Raman laser beams, thereby forming a combined pair of parallel-polarized Raman laser beams), Raman separating optics (the Raman separating optics receiving the combined pair of parallel-polarized Raman laser beams and separating the combined pair of parallel-polarized Raman laser beams into at least one triplet of first, second, and third pairs of Raman laser beams), at least one triplet of first, second, and third Raman redirector elements (each Raman redirector element receiving a corresponding pair of Raman laser beams and directing a corresponding pair of Raman laser beams such that a corresponding pair of Raman laser beams are overlapping and counter-propagating through an atomic cloud), and launching beam optics (the launching beam optics receiving a launching beam, separating the launching beam into at least one pair of launching sub-beams, a direction of a first launching sub-beam in each pair of launching sub-beams opposite a direction of a second launching sub-beam in each pair of launching sub-beams, and directing each launching sub-beam such that a direction of each launching sub-beam is orthogonal to a direction of a corresponding triplet of first, second, and third pairs of Raman laser beams, each launching sub-beam delivering an initial momentum to atoms in a corresponding atomic cloud).

In various rotational embodiments, the first launching sub-beam and the second launching sub-beam in each pair of launching sub-beams operate in a time-multiplexed manner or simultaneously; the Raman combining optics include a polarizing beam splitter (the polarizing beam splitter receiving the pair of Raman laser beams and combining the pair of Raman lasers beams to thereby form the combined pair of parallel-polarized Raman laser beams), a Raman laser beam switch (the Raman laser beam switch receiving the combined pair of parallel-polarized Raman laser beams and simultaneously switching the combined pair of parallel-polarized Raman laser beams to thereby form a sequence of three Raman pulses, pulses in the sequence of three Raman pulses splitting, redirecting, and re-combining atomic wavepackets of the atomic cloud, respectively), and a Raman laser beam output port (the Raman laser beam output port receiving the thus switched combined pair of parallel-polarized Raman laser beams and directing the thus switched combined pair of parallel-polarized Raman laser beams to the Raman separating optics).

In other rotational embodiments, the Raman separating optics include a first polarizing beamsplitter (the first polarizing beamsplitter receiving the combined pair of parallel-polarized Raman laser beams, splitting off a first portion of the combined pair of parallel-polarized Raman laser beams as the first pair of Raman laser beams, redirecting the first pair of Raman laser beams, and passing a first remaining portion of the combined pair of parallel-polarized Raman laser beams), a second polarizing beamsplitter (the second polarizing beamsplitter receiving the first remaining portion of the combined pair of parallel-polarized Raman laser beams, splitting off a second portion of the first remaining portion of the combined pair of parallel-polarized Raman laser beams as the second pair of Raman laser beams, redirecting the second pair of Raman laser beams, and passing a second remaining portion of the combined pair of parallel-polarized Raman laser beams), a third polarizing beamsplitter (the third polarizing beamsplitter receiving the second remaining portion of the combined pair of parallel-polarized Raman laser beams and redirecting the second remaining portion of the combined pair of parallel-polarized Raman laser beams as the third pair of Raman laser beams); and the Raman separating optics further include three half-wave plates (each half-wave plate optically located immediately before a corresponding polarizing beamsplitter).

In yet other rotational embodiments, the Raman separating optics include a beamsplitter or an optical demultiplexer switch (the beamsplitter or optical demultiplexer switch receiving the combined pair of parallel-polarized Raman laser beams and separating the combined pair of parallel-polarized Raman laser beams into at least two sets of combined pairs of parallel-polarized Raman laser beams for multi-axis sensing), and the Raman separating optics directing each set of combined pairs of parallel-polarized Raman laser beams such that a direction of each set of combined pairs of parallel-polarized Raman laser beams is orthogonal to a direction of each other of the sets of combined pairs of parallel-polarized Raman laser beams for multi-axis sensing; and the optical demultiplexer switch generating the at least two sets of combined pairs of parallel-polarized Raman laser beams in a time-multiplexed manner.

In still other rotational embodiments, each Raman redirector element includes a quarter-wave plate (the quarter-wave plate receiving and transmitting a corresponding pair of Raman laser beams) and a mirror (the mirror receiving and reflecting a corresponding pair of Raman laser beams); the at least two laser cooling sub-beams is three laser cooling sub-beams, the at least two reflective grating chips is first, second, and third reflective grating chips (a direction from the first reflective grating chip to the second reflective grating chip being orthogonal to a direction from the first reflective grating chip to the third reflective grating chip), the at least one triplet of first, second, and third pairs of Raman laser beams is three triplets of corresponding first, second, and third pairs of Raman laser beams, the at least one triplet of first, second, and third Raman redirector elements is three triplets of corresponding first, second, and third Raman redirector elements, the at least one pair of launching sub-beams is first and second pairs of launching sub-beams (a direction of the first pair of launching sub-beams being orthogonal to a direction of the second pair of launching sub-beams), and the optical system implements a three-axis gyroscope in a time-multiplexed manner; and the optical system implements a gyroscope with one of a single sensing axis, two sensing axes, or three sensing axes.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

FIGS. 3A and 3C illustrate reflective grating chips in accordance with one or more embodiments of the present invention, while

DETAILED DESCRIPTION

To better understand the need to simplify the optical system associated with a light pulse AI (LPAI) accelerometer or LPAI gyroscope, one needs to understand how both devices operate and their optical requirements. The following provides a summary of the how both an LPAI accelerometer and LPAI gyroscope operate.

Raman Transitions

Figure 1:
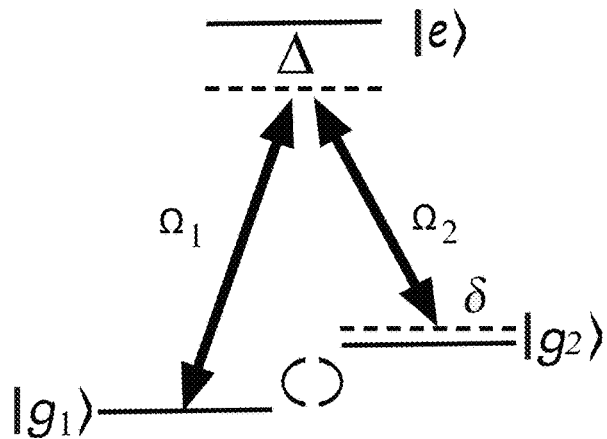
FIG. 1 illustrates the atomic energy levels employed in a light pulse atomic interferometer (LPAI) in accordance with one or more embodiments of the present invention.

An LPAI uses a three-level atomic system for stimulated Raman transitions. The three energy levels of an atom comprise hyperfine-split ground states $|g_1\rangle$ and $|g_2\rangle$, and an excited state $|e\rangle$, as illustrated in FIG. 1. The counter-propagating, Doppler-sensitive Raman laser beams, having polarization configurations of $\sigma^+\sigma^+$, $\sigma^-\sigma^-$, or lin-perp-lin, are configured to coherently drive the microwave transition (e.g., the atomic clock transition), between the hyperfine-split ground states $|g_1\rangle$ and $|g_2\rangle$ and provide photon recoils, i.e., a momentum kick, $\hbar k_{eff}$, to one of the ground states, where $k_{eff}$ is an effective wavevector of the Raman laser fields. This is accomplished by a two-photon process, where an atom in the state $|g_1\rangle$ is transferred to a virtual excited state that is detuned as $\Delta$, the single-photon detuning, from the state $|e\rangle$ and then to the state $|g_2\rangle$ via stimulated emission by two Raman laser beams. The single-photon Rabi frequency $\Omega_2$ of a Raman laser beam is resonant with a transition $|e\rangle$ to $|g_2\rangle$ with an offset $\Delta$. The single-photon Rabi frequency $\Omega_1$ of a Raman laser beam is resonant with a transition $|g_1\rangle$ to $|e\rangle$ with an offset $\delta$, the two-photon detuning, in addition to the offset $\Delta$. The effective two-photon Rabi frequency is $$\Omega_{eff,0} = \Omega_1\Omega_2/2\Delta, \quad \text{(Eq. 1)}$$

where $$\Omega_{eff} = \sqrt{\Omega_{eff,0}^2 + \delta 2}. \quad \text{(Eq. 2)}$$

Under Raman transitions, the atomic cloud effectively behaves as a two-level system with states $|g_1\rangle$ and $|g_2\rangle$.

When the atomic cloud comprises $^{87}$Rb atoms, the states $|g_1\rangle = |F=1, m_F=0\rangle$ and $|g_2\rangle = |F=2, m_F=0\rangle$ are hyperfine-split states of the ground state $|5S_{1/2}\rangle$, and the state $|e\rangle$ is the excited state $|5P_{3/2}\rangle$.

LPAI Accelerometer Operation

Figure 2A:
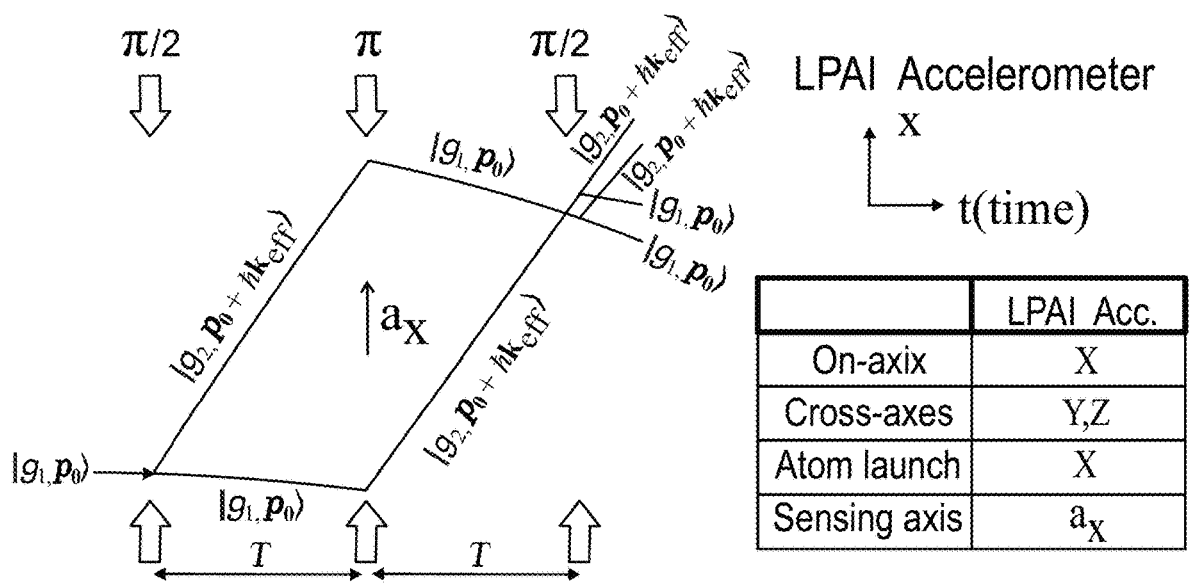
FIGS. 2A and 2B illustrate the operations performed on an atomic cloud during operation of an LPAI accelerometer and an LPAI gyroscope, respectively, in accordance with various embodiments of the present invention.

The schematic of operations performed on the atomic cloud during operating of the LPAI accelerometer is shown in FIG. 2A. After trapping and cooling the atomic cloud in the MOT, the MOT is turned off and the atomic cloud is released or launched along the sensing axis, i.e., the axis of the Raman laser beams. The atomic cloud is then subject to inertial forces such as accelerations and rotations along all three axes, and thus the atomic cloud may move along all three axes. Accordingly, the LPAI accelerometer may be referred to as a free-space LPAI accelerometer.

After releasing the atomic cloud from a MOT and launching the atomic cloud along an acceleration sensing direction, a sequence of three Raman pulses ($\pi/2 \rightarrow \pi \rightarrow \pi/2$) is applied to the atomic cloud, which split, redirect, and re-combine the atomic wavepackets of the atomic cloud, respectively, for measuring atomic interference fringes. The Raman pulses propagate along the sensing axis of the LPAI accelerometer. Furthermore, during AI operations (i.e., while applying the Raman pulses), the LPAI accelerometer does not have a Sagnac area (i.e., an area enclosed by atoms of the atomic cloud in space during AI operations) if the atoms only propagate along the sensing axis, for example, in the X direction in the example illustrated in FIG. 2A. However, the LPAI accelerometer may have a non-zero Sagnac area due to motion of the atoms in a direction transverse to the sensing axis.

When atoms in the atomic cloud are in the state $|g_1, p_0\rangle$, with $p_0$ being an initial momentum of the atoms, the first Raman pulse ($\pi/2$-pulse) acts as a beamsplitter creating a superposition between the two atomic states of $|g_1, p_0\rangle$ and $|g_2, p_0+\hbar k_{eff}\rangle$, as illustrated in FIG. 2A, by creating the momentum kicked state $|g_2, p_0+\hbar k_{eff}\rangle$ from the $|g_1, p_0\rangle$ state due to absorption recoil. The initial momentum $p_0$ may be due to two sources: (1) as the atoms have a finite temperature, they will have finite velocity spreads in 3D space with corresponding momentums, and (2) the atomic cloud may be subjected to a launching beam, i.e., a pushing beam, which can deliver initial momentum to the atomic cloud along the acceleration sensing direction, and all of the atoms in the atomic cloud receive an initial momentum primarily in the direction of the launching beam. The initial momentum of the atomic cloud can be controlled in accordance with a moving platform's linear acceleration measured from a conventional inertial measurement unit (IMU) co-sensor, which allows the LPAI acceleration measurement to stay near the atom interference mid-fringe for greater sensitivity. After performing the first Raman pulse, two atomic wavepackets in the states $|g_1, p_0\rangle$ and $|g_2, p_0+\hbar k_{eff}\rangle$, respectively, propagate freely for the first interrogation time T. The second Raman pulse ($\pi$-pulse) is applied to the two atomic wavepackets. The second Raman pulse acts as a mirror turning the state $|g_1, p_0\rangle$ to the state $|g_2, p_0+\hbar k_{eff}\rangle$, and the state $|g_2, p_0+\hbar k_{eff}\rangle$ to the state $|g_1, p_0\rangle$. The two atomic wavepackets are then allowed to propagate freely for the second interrogation time T. As time progresses, due to atoms in different atomic states having different momenta, the two atomic wavepackets converge, such that after the second interrogation time T has elapsed, the atomic wavepackets along two interferometric arms overlap with each other. The third Raman pulse ($\pi/2$-pulse) is applied to the atomic wavepacket in the state $|g_2, p_0+\hbar k_{eff}\rangle$ and the atomic wavepacket in the state $|g_1, p_0\rangle$, recombining the atomic wavepackets to interfere with each other. After performing the third Raman pulse (i.e., interfering atomic wavepackets), the atomic population of the interfered atomic wavepackets are detected through atomic fluorescence to measure the atom interference fringe. For example, the atoms in the state $|g_2\rangle$ will fluoresce when subjected to the detection laser beam, whereby the probability $Pg_2$ of atoms being in the state $|g_2\rangle$ is measured as the phase of the third Raman pulse is scanned. Through this procedure, atom interferometry fringes are measured. The value of acceleration a is encoded in the probability $$Pg_2 = \frac{1}{2}(1 - \cos \Delta\phi_{acc}), \tag{Eq. 3}$$

where $$\Delta\phi_{acc} = k_{eff} \cdot aT^2. \tag{Eq. 4}$$

Accordingly, the value of acceleration a is measured by detecting the atom interference fringes.

Compared to the LPAI accelerometer just described, an LPAI gravimeter uses the free-fall atomic clouds without atom launching or employs an atomic cloud launched against gravity using an atomic fountain configuration. An LPAI horizontal gravity gradiometer uses two horizontally separate atomic clouds launched against gravity using an atomic fountain configuration and share the horizontally-aligned Raman laser beams. An LPAI vertical gravity gradiometer uses two vertically separate atomic clouds launched against gravity using an atomic fountain configuration and share the vertically-aligned Raman laser beams.

LPAI Gyroscope Operation

Figure 2B:
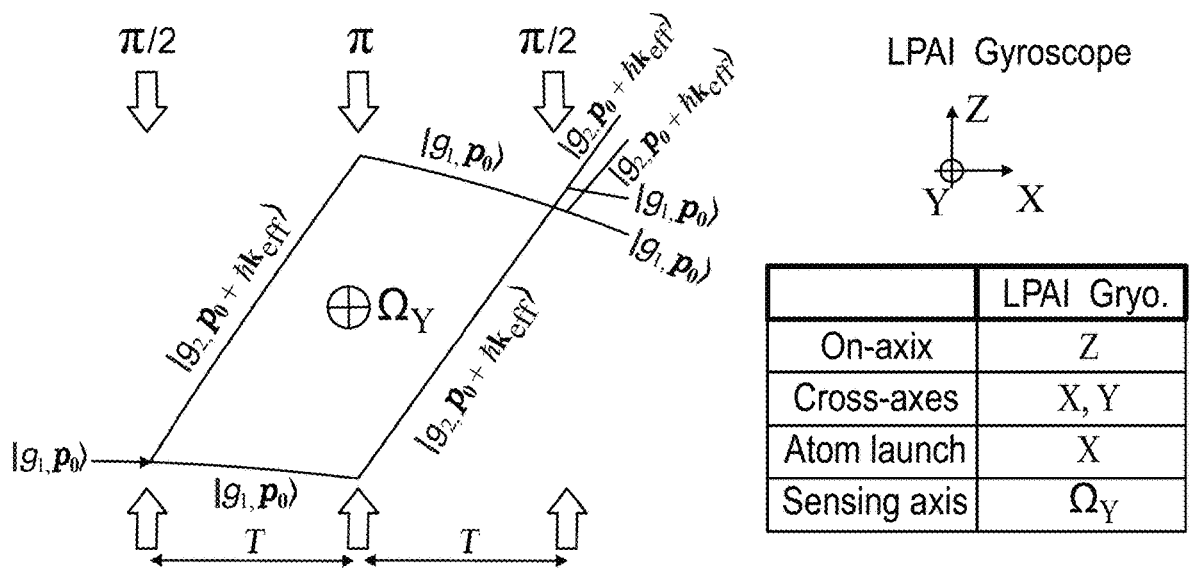

FIG. 2B illustrates how an LPAI gyroscope may be formed using a similar physical configuration and set of optical signals. After releasing the atomic cloud from a MOT, the atomic cloud is launched along the orthogonal direction of the Raman laser beams and the rotation sensing direction. The LPAI gyroscope employs a sequence of three Raman pulses ($\pi/2 \rightarrow \pi \rightarrow \pi/2$), which split, redirect, and recombine an atomic wavepacket of the atomic cloud for measuring the atom interference fringes. In the LPAI gyroscope, the atoms in the atomic cloud enclose an area in space, e.g., the Sagnac area, while propagating along the X axis direction (due to their initial momentum from the launching beam) while the sequence of the three Raman pulses is applied to the atomic cloud along the Z axis direction. In contrast to the sequence of three Raman pulses employed in the LPAI accelerometer, the three Raman pulses employed in the LPAI gyroscope are spaced apart not only in time, but also in space (along the X and Z axes as illustrated). Further, as illustrated in FIG. 2B, while the Raman pulses in the LPAI accelerometer are parallel to the sensing axis (the X axis as illustrated in FIG. 2A), the axis of the Raman laser beams in the LPAI gyroscope (the Z axis as illustrated) is orthogonal to both the sensing axis of rotation (the Y axis as illustrated) and the initial momentum axis (the X axis as illustrated).

After applying the spatially- and time-separated sequence of three Raman pulses, the atomic population of interfered atomic wavepackets are detected through atomic fluorescence to measure the atom interference fringes. For example, the atoms in the state $|g_2\rangle$ will fluoresce when subjected to the detection laser beam, whereby the probability $Pg_2$ of atoms being in the state $|g_2\rangle$ is measured as the phase of the third Raman pulse is scanned. The value of angular velocity $\Omega$ is encoded in the probability $$Pg_2 = \frac{1}{2}(1 - \cos \Delta\phi_{rot}), \tag{Eq. 5}$$

where $$\Delta\phi_{rot} = k_{eff} \cdot 2(v\lambda\Omega)T^2, \tag{Eq. 6}$$

and where v is an initial velocity of atoms in the atomic cloud. Accordingly, the value of angular velocity $\Omega$ is measured by detecting atomic fringes.

Optical System Simplification Using a Grating for Laser Cooling

One factor contributing significantly to the complexity of an LPAI accelerometer or LPAI gyroscope is the number of laser cooling beams for the MOT used to generate the atomic cloud. Using a reflective grating chip, one can reduce the number of laser cooling beams from the traditional six to just one externally supplied laser cooling beam.

Figure 3A:
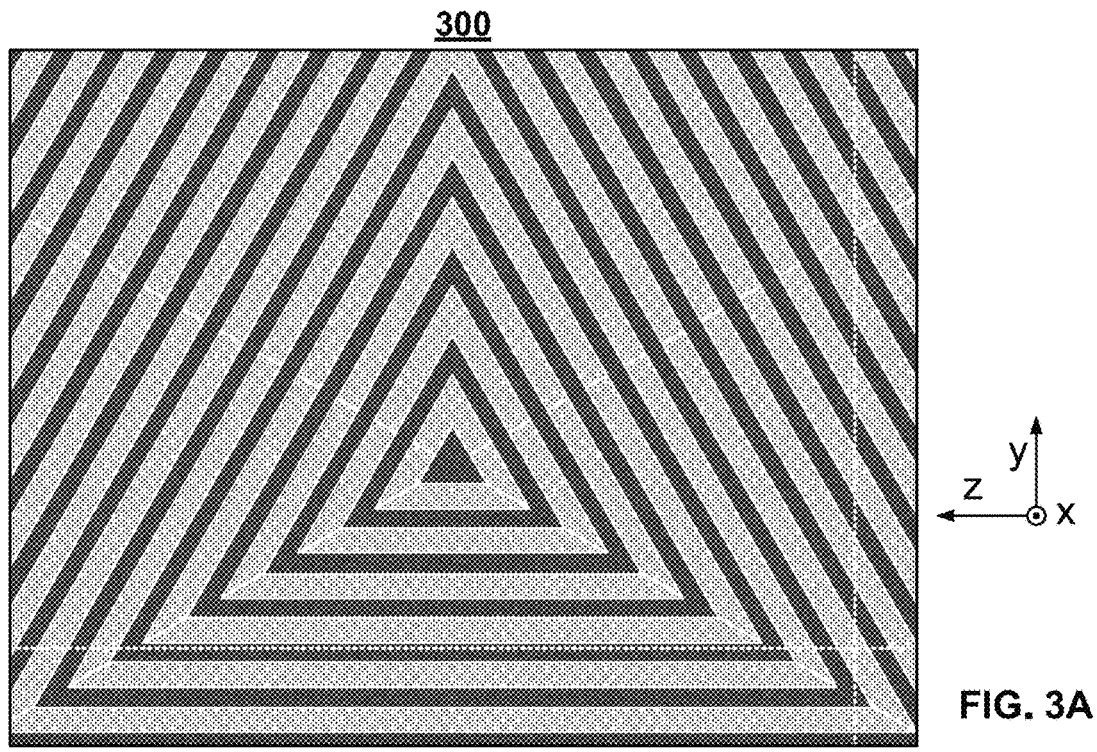
Figure 3B:
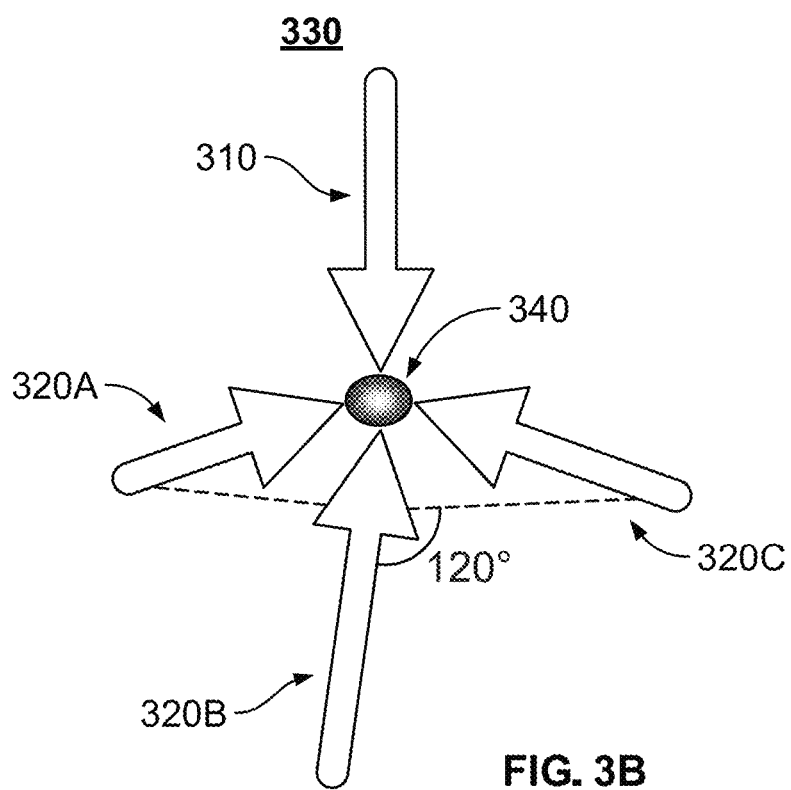
FIG. 3B illustrates the corresponding laser beams.

FIG. 3A illustrates the grating pattern of a reflective binary grating chip 300 in accordance with one or more embodiments of the present invention. Each of the three sections of the reflective binary grating chip 300 diffracts approximately 40% of the incoming laser cooling beam 310 into each of the +1/−1 orders, approximately 5% into the 0 order, with the remaining 15% into higher orders. The reflective binary grating chip 300 thus creates a total of six primary diffracted laser beams, of which only three of the diffracted laser beams 320A, 320B, 320C are laser cooling beams due to their diffraction direction. This results in the tetrahedral MOT 330 illustrated in FIG. 3B. These three diffracted laser cooling beams 320A, 320B, 320C, along with the incident laser cooling beam 310, serve to cool the atomic cloud 340. Note that due to the nature of the four total laser cooling beams, the atomic cloud 340, while having a generally circular cross-section in the plane parallel to the reflective binary grating chip 300, will have a generally elliptical cross-section in the plane orthogonal to the reflective grating chip 300, resulting in an overall "pancake" shaped atomic cloud 340.

The reflective binary grating chip 300 may be fabricated by depositing an approximately 195 nm thick $SiO_2$ layer on a Si wafer. An e-beam resist and corresponding e-beam exposure is used to form a 50:50 pattern in the e-beam resist having an approximately 1.2 μm pitch, i.e., the lines and spaces each have widths of approximately 600 nm. The e-beam resist pattern is transferred to the $SiO_2$ layer using an etch process. The resulting $SiO_2$/Si surface then receives an approximately 100 nm thick metal coating, for example an Al or Au metal coating. The reflective binary grating chip 300 may be formed by other suitable materials, such as a metallic or dielectric coating, and fabrication methods. As will be appreciated by those of skill in the art, the dimensions of the various features of the reflective binary grating chip 300 will need to be tuned to match the wavelength of the laser cooling beam 310, which depends upon the atomic species used to form the atomic cloud 340. The dimensions provided in this paragraph correspond to those required for use with a $^{87}$Rb atomic cloud 340, and its corresponding laser cooling beam 310 having a wavelength of 780.24 nm.

Figure 3C:
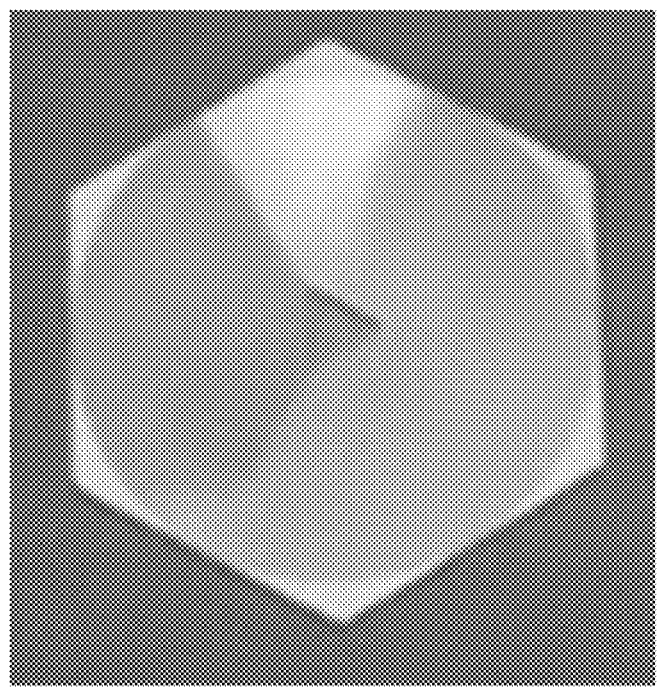

While the described reflective binary grating chip 300 employs two levels, i.e., it is a binary grating, in other embodiments of the present invention, the reflective grating chip may be a multi-level grating, for example, by employing additional levels, or a blazed grating. The use of a multi-level grating or a blazed grating can reduce the amount of the laser cooling beam 310 that is reflected in the $0^{th}$ order and diffracted in orders other than the desired +1/−1 orders, thereby improving overall efficiency of the reflective grating chip. In certain embodiments of the present invention, a triangular-shaped aperture may be cut out of the center of the reflective grating chip 300, as illustrated in FIG. 3C, using, for example, a laser, to reduce reflection, i.e., $0^{th}$ order, of the laser cooling beam 310 and thereby minimize potential intensity imbalances in the tetrahedral MOT 330.

Figure 4:
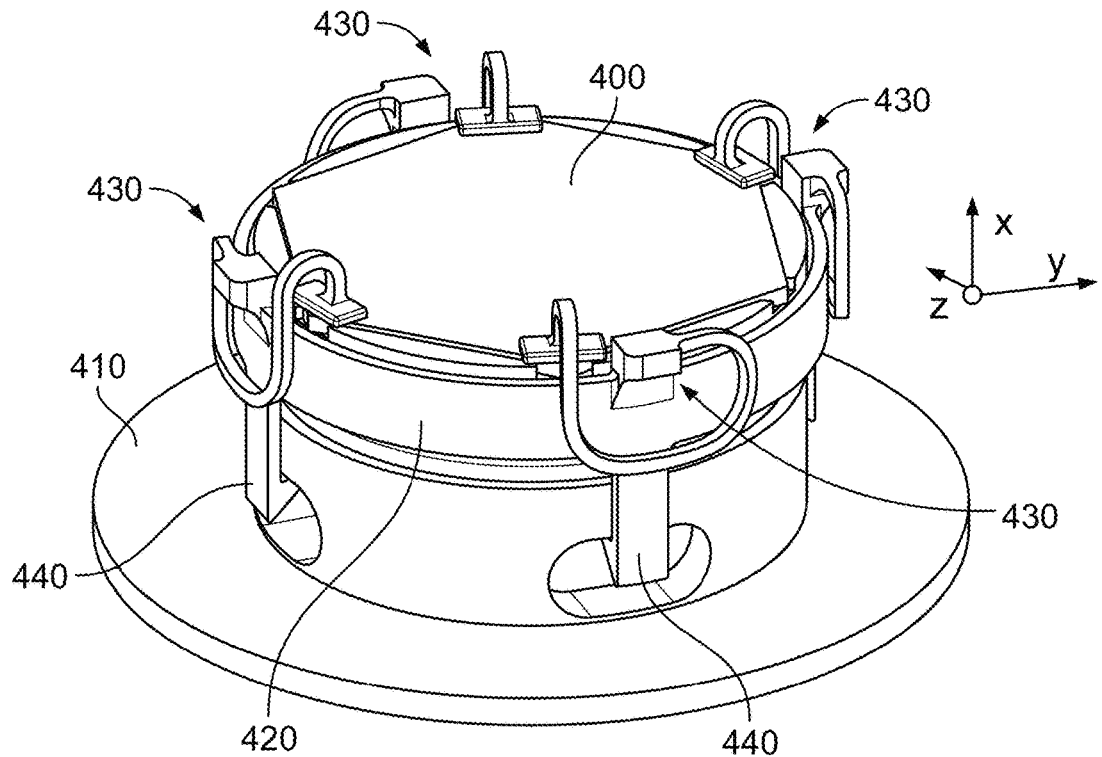
FIG. 4 illustrates the mounted reflective grating chip in accordance with one or more embodiments of the present invention.

FIG. 4 illustrates a mounted reflective grating chip 400 in accordance with one or more embodiments of the present invention. The reflective grating chip 400 is mounted to a flanged pedestal 410 with a retaining ring 420 and set of clips 430. The retaining ring 420 and the flanged pedestal 410 may be formed of a machined titanium alloy, while the set of clips 430 may be formed of a titanium alloy using a 3D printing process, for example, a laser sintering process, though other suitable materials and fabrication methods can be employed. The set of clips 430 are welded to the retaining ring 420, while the retaining ring 420 is attached to the flanged pedestal 410 via a series of locking tabs 440. The flanged pedestal 410 is welded or brazed into a negative X-axis side window recess parallel to, but opposite, optical port 725A found in a vacuum chamber 705 within a compact single-axis LPAI accelerometer 700, as described below with reference to FIG. 7. This optical mounting process, which employs one or more mechanical retainers or fasteners, is termed "hard mounting."

By hard mounting the reflective grating chip 400 to the flanged pedestal 410 and brazing the flanged pedestal 410 to the vacuum chamber 705, the entire reflective grating chip 400 assembly is very robust and can tolerate the mechanical vibrations found in a dynamic environment without losing alignment. This is in contrast to prior art reflective grating chips that employed epoxy to mount the reflective grating chips, which did not withstand the rigors of a dynamic environment. Further, due to outgassing of the epoxy, it was not compatible with the high vacuum levels required for the vacuum chambers, especially if the vacuum chamber uses passive vacuum pumping. In like manner, the epoxy was not compatible with the high temperature employed to bake out the vacuum chamber, especially if the vacuum chamber will use passive vacuum pumping.

Optical System Simplification Using Time Multiplexing of Optical Fibers

Figure 5:
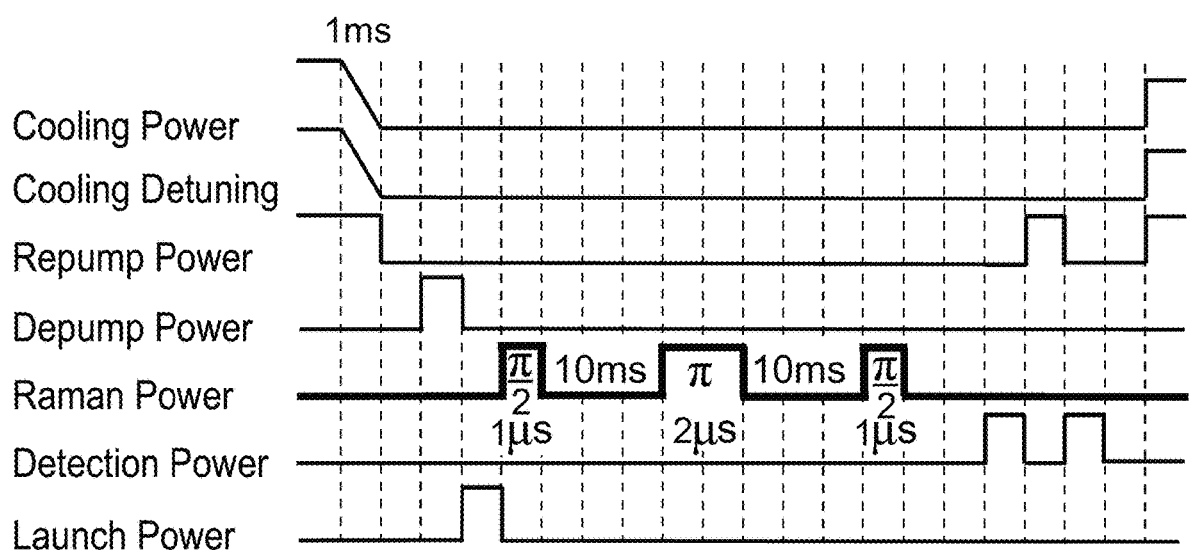
FIG. 5 illustrates the timing and detuning sequence of the optical signals employed by one or more embodiments of the present invention.

FIG. 5 illustrates a timing and detuning diagram for the various laser beams employed to implement the LPAI process. As illustrated in FIG. 5, several of the various laser beams do not overlap in terms of when they are on. Thus, one can time multiplex various laser beams to thereby reduce the number of optical ports to the vacuum chamber in which the atomic cloud 340 will be formed.

A first input optical fiber, which provides the laser cooling beam 310 to an LPAI accelerometer, may also provide the depump laser beam by changing the modulation frequency, i.e., detuning, the laser cooling beam 310 to generate the depump laser beam as illustrated in FIG. 5. A second input optical fiber provides the pair of Raman laser beams from two separate light modulators that are subsequently combined. The second input optical fiber also provides the repump laser beam and the detection laser beam, with their timing as illustrated in FIG. 5. The repump laser beam and the detection laser beam are again generated by changing the modulation frequency, i.e., detuning, of one or more of the pair of Raman laser beams. This detuning may be implemented using a single-sideband (SSB) frequency modulator. An exemplary SSB frequency modulator is disclosed in U.S. patent application Ser. No. 16/831,350, entitled "Compact Laser Source with Frequency Modulators Generating Multiple Lines," and assigned to the same assignee as this application, the contents of which are incorporated herein by reference. As illustrated in FIG. 5, the optical power of the launching beam, i.e., the launching beam pulse, precedes the sequence of three Raman pulses.

Figure 6:
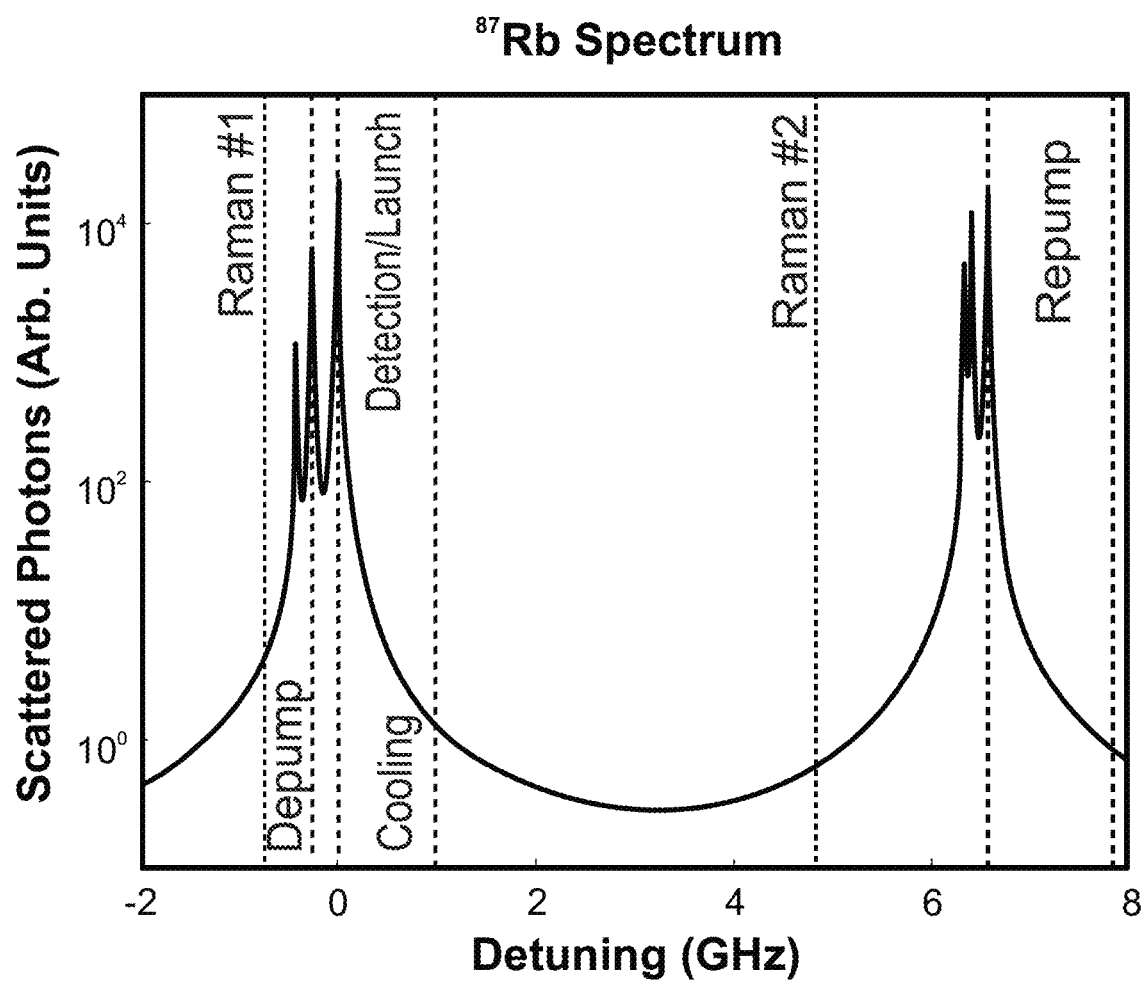
FIG. 6 illustrates the relative detuning of the various optical signals employed by one or more embodiments of the present invention.

FIG. 6 illustrates the relative detuning of the various optical signals when the atomic cloud 340 is formed of $^{87}$Rb, though in other embodiments of the present invention other suitable atomic species may be used to form the atomic cloud 340, for example, $^{133}$Cs.

U.S. patent application Ser. No. 16/831,350, describes the timing and generation of the multiple laser lines illustrated in FIGS. 5 and 6. As described in U.S. patent application Ser. No. 16/831,350, because of the timing of the various laser lines, multiple laser lines may be generated and time division multiplexed onto a single optical fiber. As reflected in FIGS. 5 and 6, a first optical input channel may carry both the cooling laser beam 310 and the depump laser beam as neither will be on simultaneously. In a similar manner, a second optical input channel may carry both the detection laser beam and the repump laser beam. While the pair of Raman laser beams must be delivered simultaneously, once they are generated by two separate laser light modulators, they can be combined and carried by a third optical input channel. In the case of an LPAI accelerometer, if a launching beam is employed to define the initial momentum of the atomic cloud along the acceleration sensing direction, i.e., the Raman laser beam axis, before the sequence of three Raman pulses, it may likewise be combined with one of the pair of counter-propagating Raman laser beams. In particular, the detuning of one of the pair of Raman laser beams can be adjusted as the near resonance to operate it as the launching beam. Depending on the propagation direction of the launching beam, the initial momentum can be defined along a positive axis direction or its opposite, i.e., in the corresponding negative axis direction. The intensity and detuning of the launching beam determine the size of the initial momentum on the atomic cloud. In some embodiments, a conventional IMU co-sensor can provide information about a moving platform's linear acceleration in order to control the initial momentum resulting from the launching beam, which allows the LPAI acceleration measurement to stay near the atom interference mid-fringe for greater sensitivity.

While the above discussion described one way of reducing the number of optical ports by time multiplexing various laser beams for an LPAI accelerometer, time multiplexing of various combinations may also be used for an LPAI gyroscope. As an example, the cooling laser beam 310 may be combined with the depump and detection laser beams in a time-multiplexed manner. Likewise, the launching and repump laser beams can be combined in a time-multiplexed manner.

Optical System Simplification for the Raman Laser Beams (Example Based Upon a Compact, Single-Axis LPAI Accelerometer)

Figure 7A:
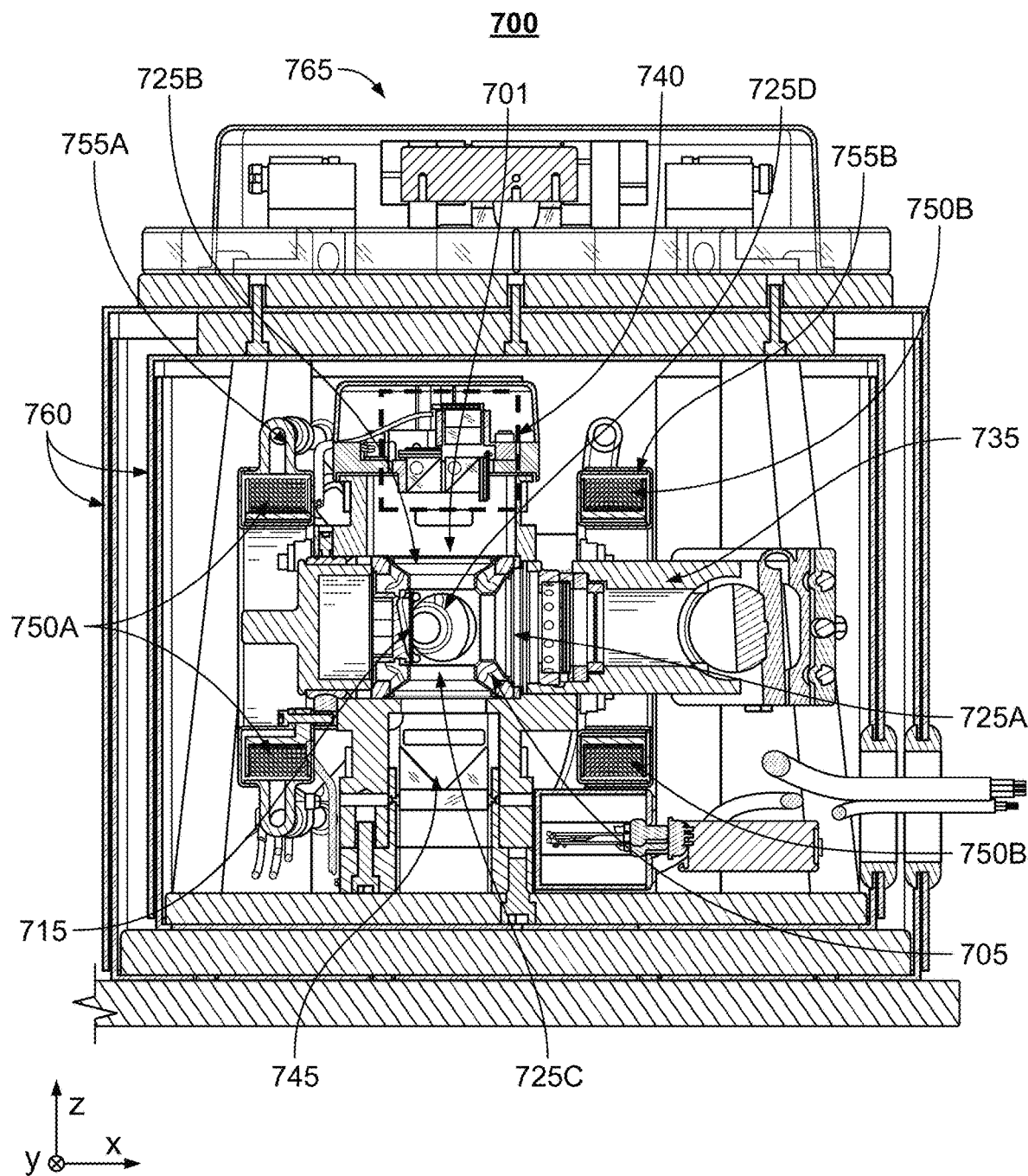
FIGS. 7A and 7B illustrate the cross-sectional view of a sensor head in accordance with one or more embodiments of the present invention.
Figure 7B:
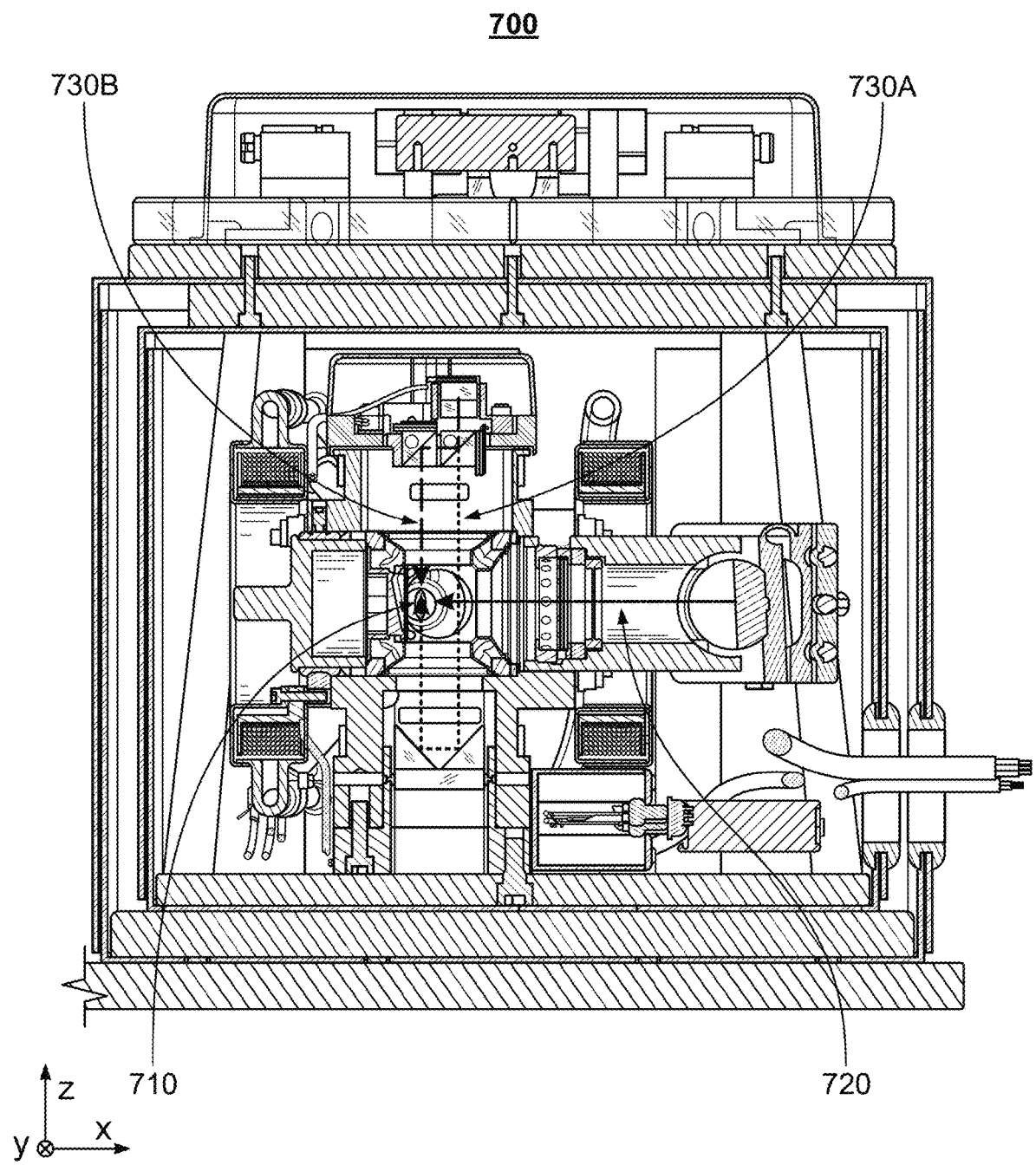

FIG. 7A illustrates a cross-sectional view of a compact single-axis LPAI accelerometer sensor head 700 of a type that may be employed with one or more embodiments of the present invention, while FIG. 7B illustrates the corresponding laser beams and resultant atomic cloud within the sensor head 700. At the heart of the sensor head 700 is a vacuum chamber 705, essentially a corner-cut cube, such as the vacuum chamber 800 described below with reference to FIG. 8, in which an atomic cloud 710 is formed. The interior structural bracing 701 of the sensor head 700 has been designed to reliably hold the vacuum chamber 705 in dynamic environments. The interior structural bracing 701 is made, for example, of a glass-reinforced epoxy laminate material such as FR-4. Within the vacuum chamber 705 is a reflective grating chip 715, such as reflective grating chip 300, 400 described above with reference to FIGS. 3 and 4, held by a retainer ring for laser cooling of the atoms in the atomic cloud 710 with a tetrahedral GMOT configuration. For example, the reflective grating chip 715, when illuminated by a single laser cooling beam 720, will create three diffractive beams (not illustrated) and three additional laser cooling beams, such as the diffracted laser beams 320A, 320B, 320C described above with reference to FIG. 3B. The vacuum chamber 705 may include as many as five optical ports, of which only four optical ports 725A-725D are illustrated in FIG. 7. These various optical ports 725A-725D will admit the laser beams required for the AI process as well as output the detection signals from the AI process.

The compact single-axis LPAI accelerometer sensor head 700 employs two main input optical fibers: (1) single laser cooling beam 720 for creating the GMOT and (2) a pair of cross-polarized, Raman laser beams 730A, 730B for the AI operation. Note that if the optional launching beam (not illustrated) is employed, it can be combined in a time-multiplexed manner with the pair of cross-polarized, Raman laser beams 730A, 730B. In addition, there is a single output multimode-fiber for atom detection, with corresponding atom detection optics (not shown) coupled to optical port 725D. The atom detection optics will be described below with reference to FIG. 12. The sensor head 700 includes a pair of photodetectors (not illustrated) to detect the intensity of the Raman laser beams 730A, 730B, such as the photodetectors 1070A, 1070B described below with reference to FIG. 10. The laser cooling beam 720 passes through a set of laser cooling beam optics 735, such as the laser cooling beam optics 1300 described below with reference to FIG. 13, before passing through optical port 725A and into the vacuum chamber 705. The same input optical fiber that provides the laser cooling beam 720 may, in some embodiments, also provide the depump/repump/detection laser beams.

The pair of cross-polarized Raman laser beams 730A, 730B are separated by a set of Raman separating optics 740, such as the Raman separating optics 1000 described below with reference to FIG. 10, and are introduced into the vacuum chamber 705 via optical port 725B. One of the Raman laser beams 730A passes through the vacuum chamber 705 and out the optical port 725C, where it is redirected by a Raman redirector element 745, such as the Raman redirector element 1100 described below with reference to FIG. 11, back into the vacuum chamber 705 via the same optical port 725C. Both Raman laser beams 730A, 730B pass through the atomic cloud 710 in a counter-propagating manner, thereby necessitating both the Raman separating optics 740 and the Raman redirector element 745.

The compact single-axis LPAI accelerometer sensor head 700 includes a pair of anti-Helmholtz coils 750A, 750B on opposite sides of the sensor head 700. The pair of anti-Helmholtz coils 750A, 750B are used to form the GMOT necessary to generate the atomic cloud 710 used in the AI process. As the current used to drive the pair of anti-Helmholtz coils 750A, 750B can cause them to heat, the pair of anti-Helmholtz coils 750A, 750B may be enclosed within corresponding cooling chambers 755A, 755B. Cooling air can then be circulated through the cooling chambers 755A, 755B, thereby cooling the pair of anti-Helmholtz coils 750A, 750B.

The majority of the compact single-axis LPAI accelerometer sensor head 700 is enclosed in a nested series of magnetic shields 760. The magnetic shields 760 minimize external magnetic fields that could reach the vacuum chamber 705 and affect the atomic clock transition, and thus the operation of the AI. The magnetic shields 760 may be formed of any suitable material. Exemplary materials for the magnetic shields 760 include high magnetic permeability metal alloys such as permalloy and mu-metal.

The compact single-axis LPAI accelerometer sensor head 700 further includes Raman combining optics 765, such as the Raman combining optics 900 described below with reference to FIG. 9, with a Raman laser beam switch. The Raman combining optics 765 serve to couple the two Raman laser beams 730A, 730B to a single optical fiber tether for delivery to the sensor head 700. The Raman laser beam switch, for example, an acousto-optic modulator (AOM), within the Raman combining optics 765 switches the two Raman laser beams 730A, 730B simultaneously to form the sequence of $\pi/2$, $\pi$, and $\pi/2$ pulses illustrated in FIG. 5. While the embodiment illustrated in FIG. 7 places the Raman combining optics 765 outside of the magnetic shields 760, in other embodiments, the Raman combining optics 765 are placed inside of the magnetic shields 760 or preferably within the vacuum chamber 705 itself, thereby eliminating the optical fiber tether between the Raman combining optics 765 and the vacuum chamber 705 and making the sensor head 700 more robust in dynamic environments.

Figure 8A:
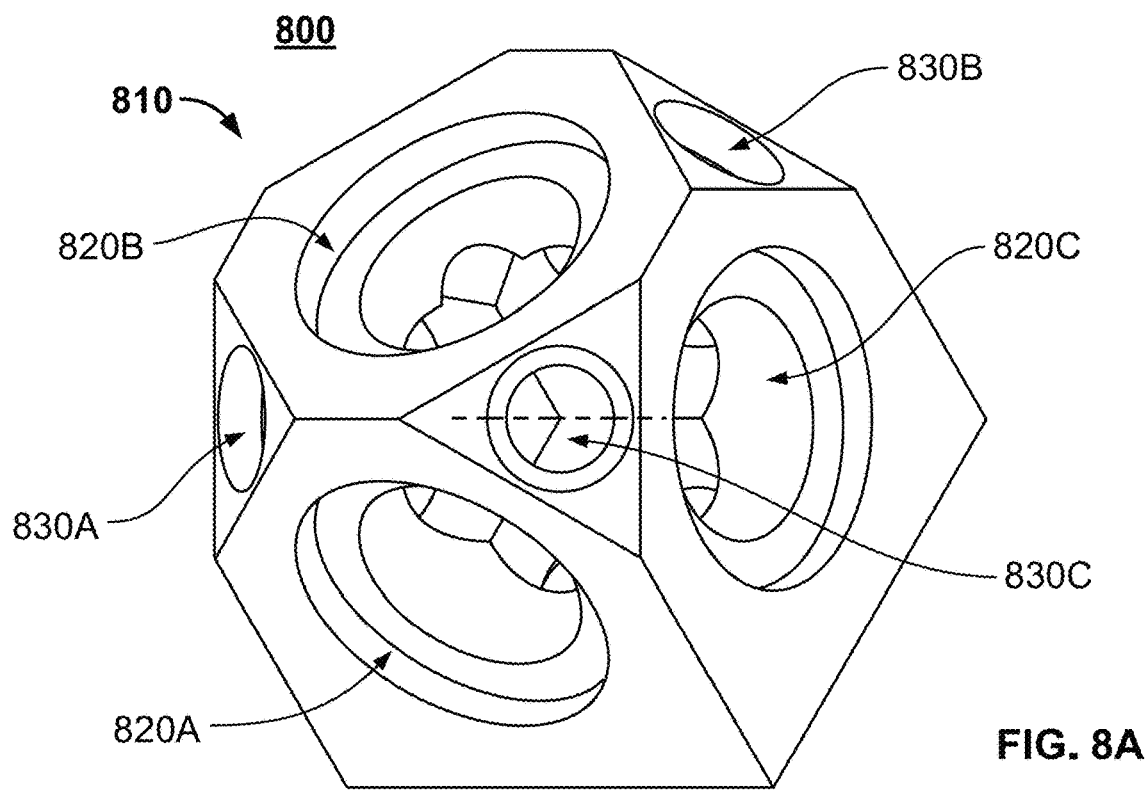
FIGS. 8A and 8B illustrate the passively pumped vacuum chamber in accordance with one or more embodiments of the present invention.
Figure 8B:
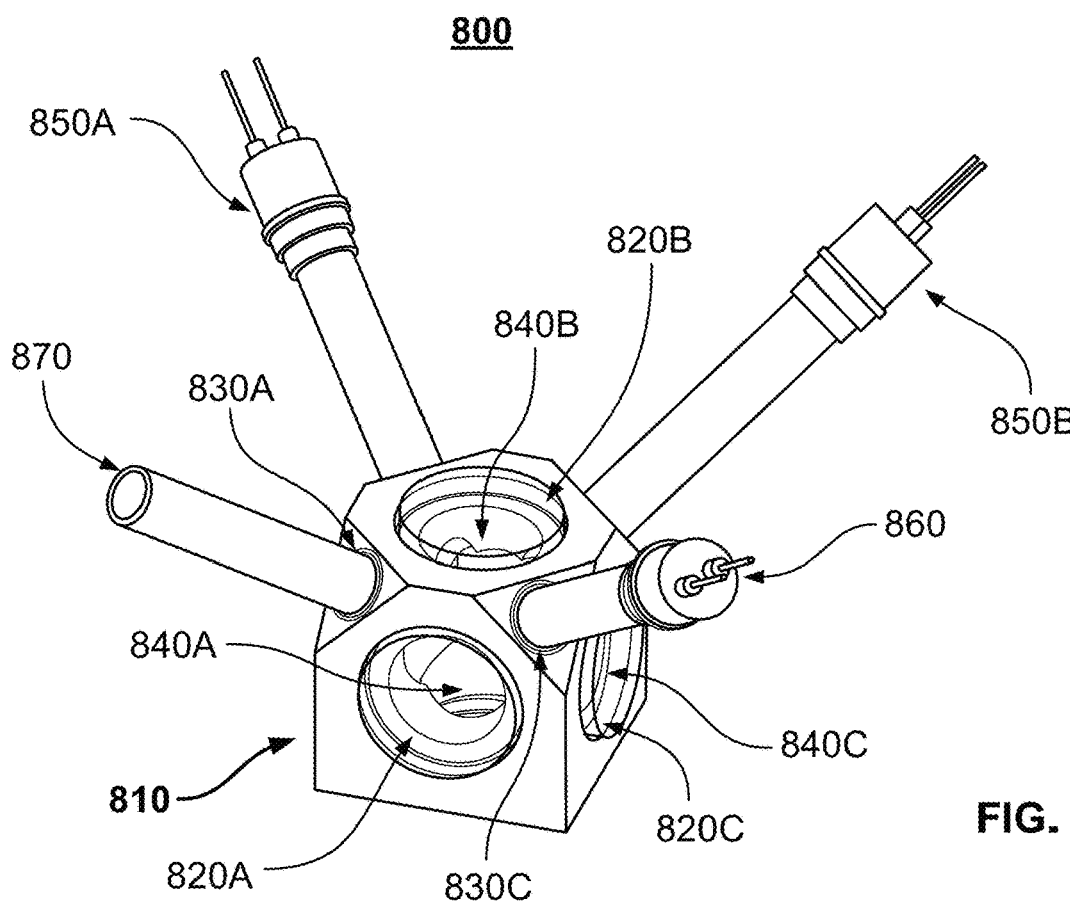

FIGS. 8A and 8B illustrate a passively pumped vacuum chamber 800 that may be used with one or more embodiments of the present invention. An exemplary passively pumped vacuum chamber is disclosed in U.S. patent application Ser. No. 16/840,637, entitled "Passively Pumped, Polycrystalline Ceramic High and Ultra-High Vacuum Chambers" and assigned to the same assignee as this application, the contents of which are incorporated herein by reference.

As illustrated in FIG. 8A, the vacuum chamber 800 includes a body 810 with six window recesses, though only three window recesses 820A-820C are clearly illustrated. The body 810 further includes four ports, though only three ports 830A-830C are clearly illustrated. FIG. 8B illustrates the body 810 with windows 840A-840C located in corresponding window recesses 820A-820C. FIG. 8B also illustrates two getter-based pumps 850A, 850B located in corresponding ports (the first being unlabeled), 830B, an atomic source 860 located in corresponding port 830C, and a pump out tube 870 located in a corresponding port 830A.

The body 810 may be formed of a polycrystalline ceramic. For example, the polycrystalline ceramic is preferably formed of alumina, with 80-99.8% alumina more preferable, though other polycrystalline ceramics, such as silicon nitride, aluminum nitride, steatite ($MgO—SiO_2$), or other oxide, nitride, or carbide-based polycrystalline ceramics may be used. In other embodiments, the body 810 may be formed of a metal, for example, titanium (Ti).

The bottoms of the window recesses 820A-820C may be formed at a slight angle, for example 2°, relative to the corresponding faces of the body 810. When windows 840A-840C are in their corresponding window recesses 820A-820C, the slight angle of the window recesses 820A-820C, and thus the slight angle of the windows 840A-840C themselves, helps to reduce optical reflections from and within the body 810.

The windows 840A-840C are preferably formed of sapphire, a transparent ceramic, with C-cut sapphire being more preferable to maintain the polarization of the transmitted light. In other cases, other materials that are optically transparent at the operating wavelength may be employed if their permeation rate for helium and other light gases is sufficiently low. The alternative window materials include, for example, various transparent ceramics, such as aluminum oxynitride, yttrium oxide, and yttria-alumina garnet. Fused silica, borosilicate glass, and soda lime glass are generally used with an active pump, for example, an ion pump, but cannot be used with a passive vacuum pump, for example, a getter pump, as their helium permeation is too high. Sapphire offers the added benefit that it is commonly brazed to alumina. To improve the optical performance of the vacuum chamber 800, the windows 840A-840C are preferably anti-reflection (AR) coated.

While FIG. 8 illustrates a cubic vacuum chamber 800, other embodiments of the present invention may use an elongated, e.g., rectangular, vacuum chamber. The dimensions of the vacuum chamber, while determined by various factors, are primarily controlled by the interrogation time, the initial atom temperature, and the Raman laser beam size. As a first example, the longer the interrogation time, the more likely the vacuum chamber will need to be elongated along the acceleration sensing axis direction. As a second example, the colder the initial atom temperature, the smaller the required vacuum chamber. As a third example, the smaller the Raman laser beam diameter, the smaller the required vacuum chamber.

While FIG. 8 illustrates a vacuum chamber 800 having six window recesses and corresponding windows, various embodiments of the present invention can reduce or increase the number of required window recesses and corresponding windows. By simplifying the optical system, e.g., by reducing the number of required optical fibers coupling light to the vacuum chamber, the number of window recesses and windows can be reduced, thereby decreasing the number of potential sources of vacuum leaks in the vacuum chamber.

Figure 9:
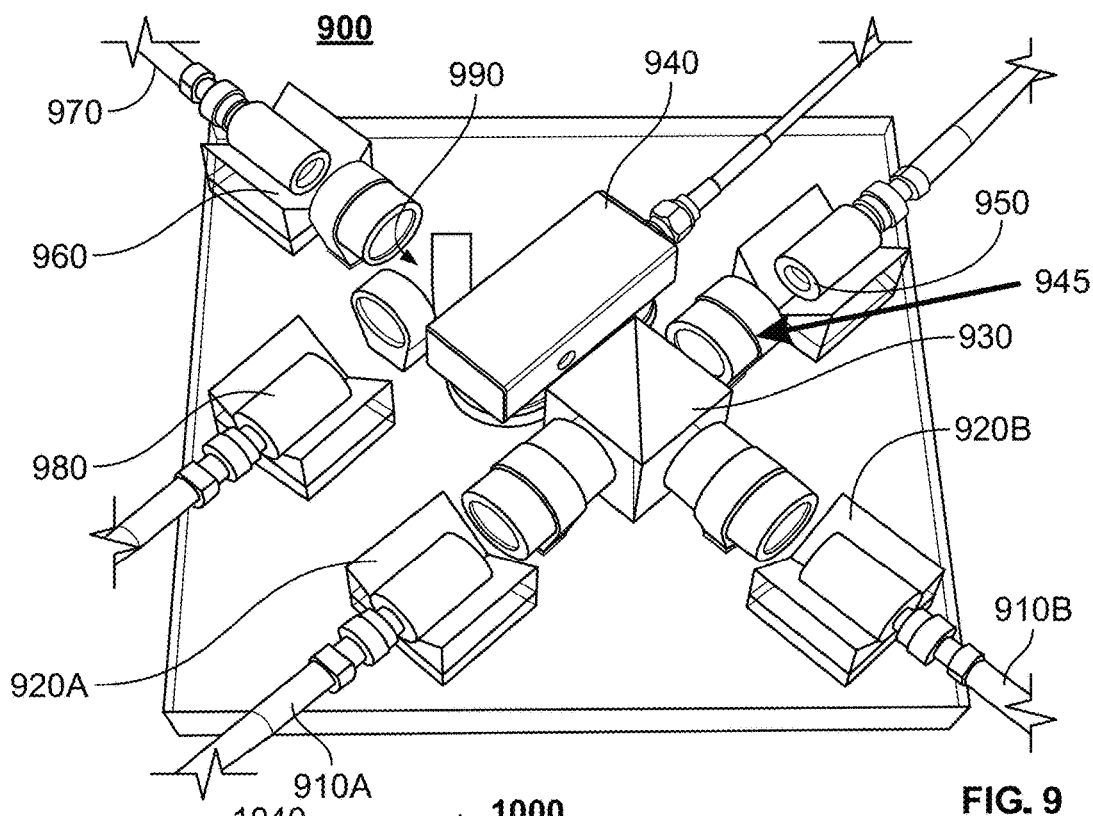
FIG. 9 illustrates the Raman combining optics in accordance with one or more embodiments of the present invention.

FIG. 9 illustrates the Raman combining optics 900 that can be used to combine the pair of Raman laser beams, which form the sequence of three Raman pulses, from their corresponding sources for transmission to the vacuum chamber being used for the LPAI accelerometer or gyroscope. The two Raman laser beams (not illustrated) are coupled to the Raman combining optics 900 via corresponding optical fibers 910A, 910B and corresponding Raman laser beam input ports 920A, 920B. The two Raman laser beams are then combined using a polarizing beamsplitter 930, which directs the cross-polarized, combined Raman laser beams to a Raman laser beam switch 940, for example, an acousto-optic modulator (AOM), which switches the two Raman laser beams simultaneously to form the sequence of $\pi/2$, $\pi$, and $\pi/2$ pulses illustrated in FIG. 5. A portion of the cross-polarized, combined Raman laser beams is directed to an optical monitor 950 by the polarizing beamsplitter 930 through Raman polarization control optics 945. The Raman polarization control optics include a polarizer to permit detection of the beat-note between the two cross-polarized combined Raman laser beams for phase-locking of the two Raman laser beams.

The optical monitor 950, which includes a fast photodetector, monitors the beat-note frequency, for example, 6.835 GHz for $^{87}$Rb atoms, between the two Raman laser beams. The beat-note frequency is demodulated down to a near-DC signal, which is then used as feedback for a voltage-controlled oscillator (VCO) or a direct digital synthesizer (DDS) (not illustrated) connected to a phase-locked light modulation device, for example, a free-space/fiber-coupled AOM or an SSB frequency modulator (not illustrated). This phase-lock light modulation device is independent of the Raman laser beam switch 940. The phase lock process employs a proportional-integral-derivative (PID) controller. The origin of the phase instability is the different optical paths between the two Raman laser beams, which can occur when a long optical fiber tether, for example, the optical fibers 910A, 910B, 970, are used to deliver the Raman laser beams from their respective laser systems to the vacuum chamber. Phase instabilities may also be due to the respective laser systems generating each of the Raman laser beams. Specifically, the Raman laser beams may start from a single 1560-nm fiber laser that traverses two separate optical channels, each of which may comprise a 1560-nm in-phase quadrature-phase (IQ) modulator, an erbium doped fiber amplifier (EDFA), and a second harmonic generator (SHG) to generate the desired 780 nm Raman laser beams (for a $^{87}$Rb-based LPAI accelerometer or gyroscope).

The combined and phase corrected Raman laser beams, having passed through the Raman laser beam switch 940, are then directed to a Raman laser beam output port 960 and corresponding optical fiber 970, which carries the combined Raman laser beams to the Raman separating optics 1000 described below with reference to FIG. 10.

In at least one embodiment of the present invention, the optical fiber 970 that carries the combined Raman laser beams to the Raman separating optics, also carries the repump and detection laser beams in a time-multiplexed manner as shown in FIG. 5. The Raman combining optics 900 thus include input optics 980 for the repump and detection laser beams and a non-polarizing beamsplitter 990 to direct the repump and detection laser beams to the Raman laser beam output port 960. In at least one other embodiment of the present invention, during the LPAI process, the two Raman laser beams can be combined with the repump and detection laser beams in a time-multiplexed manner using an SSB frequency modulator, such as that disclosed in U.S. patent application Ser. No. 16/831,350.

In at least one embodiment of the present invention, the optical fiber 970 that carries the combined Raman laser beams to the Raman separating optics, also carries the launching beam pulse in a time-multiplexed manner as shown in FIG. 5. As the launching beam is at the same wavelength as one of the Raman laser beams, the source for that Raman laser beam may also be used for the launching beam. In this case, no additional optical components need be incorporated into the Raman combining optics 900.

Figure 10A:
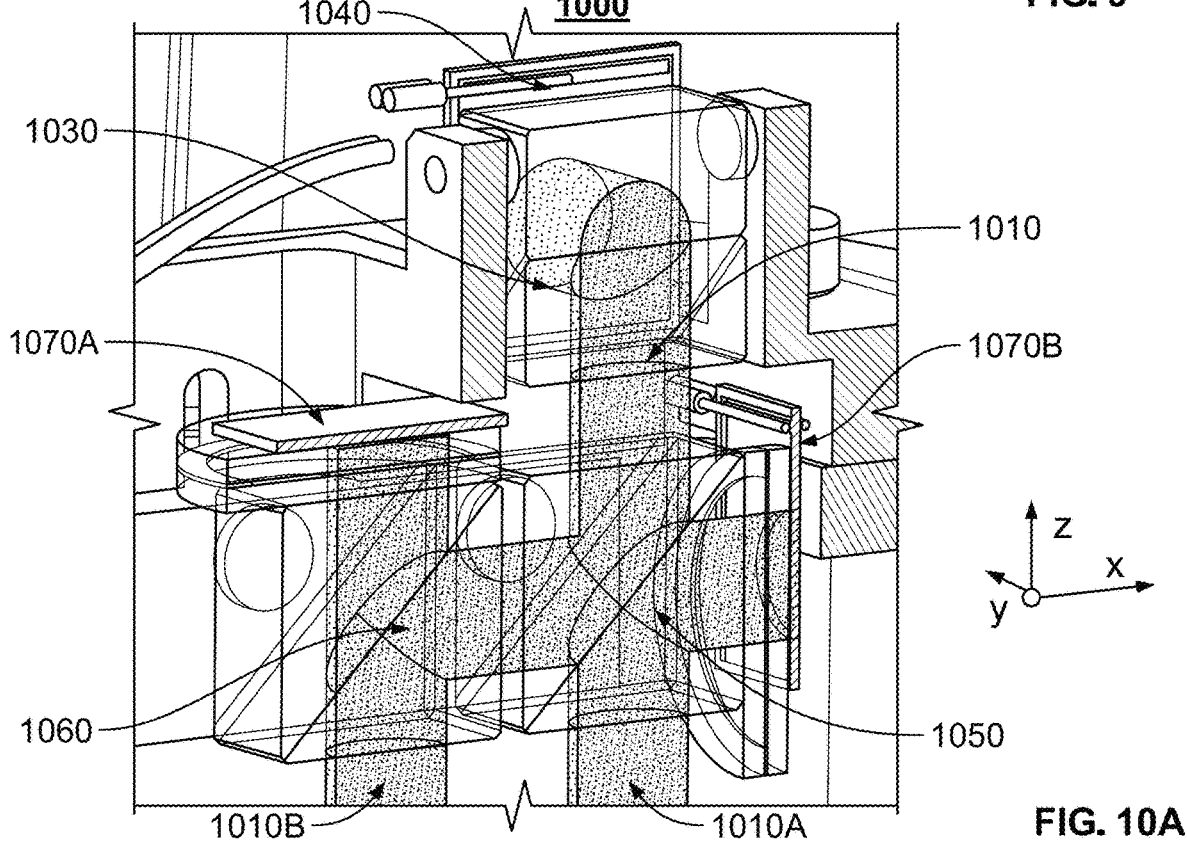
FIGS. 10A and 10B are three-dimensional (3D) illustrations of the Raman separating optics in accordance with one or more embodiments of the present invention.
Figure 10B:
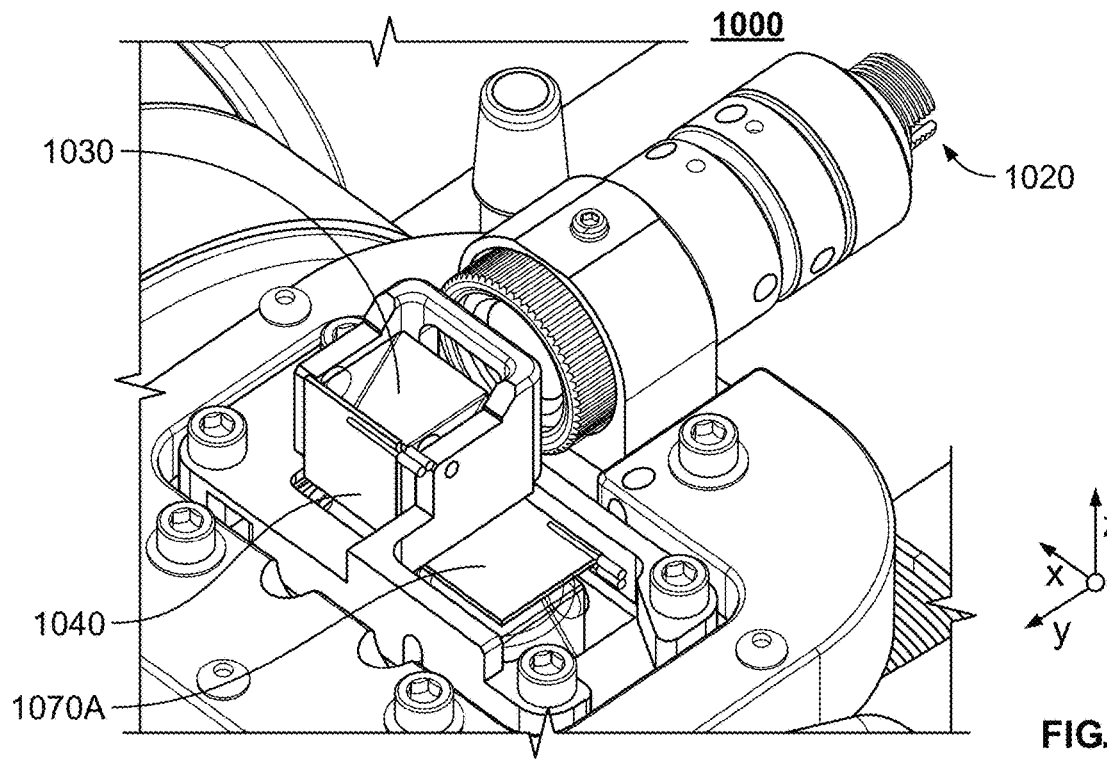

FIGS. 10A and 10B are 3D illustrations of the Raman separating optics 1000 in accordance with one or more embodiments of the present invention. The two cross-polarized combined incoming Raman laser beams 1010, annotated in red, are coupled to the Raman separating optics 1000 via an optical fiber (not illustrated) coupled to an optical fiber port 1020. The two combined Raman laser beams 1010 are then redirected 90° by a non-polarizing beamsplitter 1030, the beamsplitter 1030 having a splitting ratio of, for example, 90:10. In this example, 90% of the two combined Raman laser beams 1010 would be redirected to a first polarizing beamsplitter 1050, while the remaining 10% of the two combined laser beams 1010 would pass on to a fast photodetector 1040 for the beat-note detection between the two Raman laser beams. The beat-note frequency is demodulated down to a near-DC signal which is then used as feedback for a VCO or a DDS (not illustrated) connected to a phase-lock light modulation device, for example, a free-space/fiber-coupled AOM or an SSB frequency modulator (not illustrated). This phase-lock light modulation device is independent of the Raman laser beam switch 940 in the Raman combining optics 900. The phase lock process employs a proportional-integral-derivative (PID) controller. (As discussed above with reference to FIG. 9, the fast photodetector for beat-note detection in other embodiments may be incorporated into the Raman combining optics 900.)

The two combined Raman laser beams 1010 are then separated by the first polarizing beamsplitter 1050, with the first Raman laser beam 1010A passing through the first polarizing beamsplitter 1050, while the second Raman laser beam 1010B is redirected to a second polarizing beamsplitter 1060, which redirects the second Raman laser beam 1010B such that the first and second Raman laser beams 1010A, 1010B are substantially parallel but laterally offset from each other.

The Raman separating optics 1000 may optionally include two photodetectors 1070A, 1070B to monitor the power of the first and second Raman laser beams 1010A, 1010B. Note that due to the polarized nature of the first and second Raman laser beams 1010A, 1010B, the first Raman laser beam 1010A, having passed through the atomic cloud 710, will pass through the second polarizing beamsplitter 1060 and be detected by the photodetector 1070A. In like manner, the second Raman laser beam 1010B, having passed through the atomic cloud 710 and been redirected by the Raman redirector element 745, will be redirected by the first polarizing beamsplitter 1050 and be detected by the photodetector 1070B.

Figure 11:
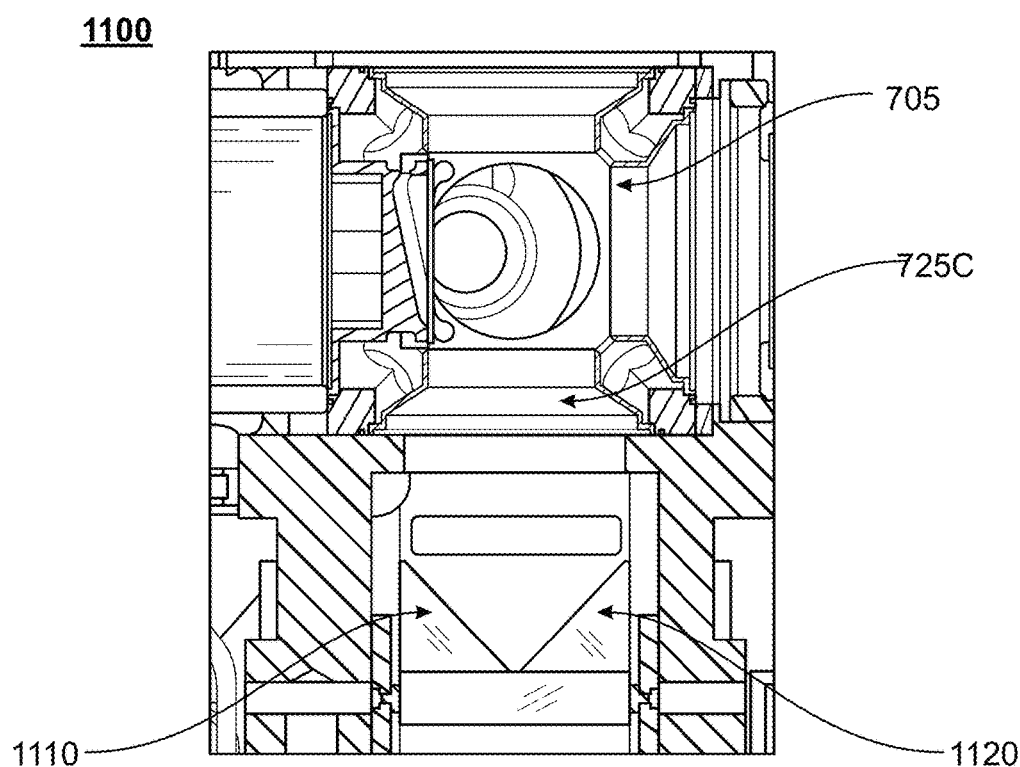
FIG. 11 illustrates the Raman redirector element in accordance with one or more embodiments of the present invention.

FIG. 11 illustrates a Raman redirector element 1100. The Raman redirector element 1100 is formed of a pair of turning mirrors 1110, 1120. The turning mirrors 1110, 1120 may, for example, be retroreflecting hollow roof prism mirrors. The size of the turning mirrors 1110, 1120 should be selected to capture as much of the Raman laser beams 730A, 730B as possible to minimize power losses. The spacing between the pair of turning mirrors 1110, 1120 should be selected to ensure that the pair of counter-propagating Raman laser beams 730A, 730B overlap as completely as possible.

While the Raman redirector element 745 is illustrated in FIG. 7 as being located outside the vacuum chamber 705 and adjacent to the optical port 725C, the Raman redirector element may be located within the vacuum chamber 705 in other embodiments. For example, the Raman redirector element may be mounted to a flanged pedestal with a set of clips. A similar mounting configuration is illustrated in FIG. 4 for the reflective grating chip 400. The flanged pedestal may be formed of a machined titanium alloy, while the set of clips may be formed of a titanium alloy using a 3D printing process, for example, a laser sintering process, though other suitable materials and fabrication methods can be employed. The set of clips may be attached to the flanged pedestal via a series of locking tabs. The flanged pedestal is welded or brazed into a port found in the vacuum chamber 705 in place of the optical port 725C. In still other embodiments, the Raman redirector element may be mounted in a flanged cup if the vacuum chamber 705 is too small to employ the flanged pedestal just discussed. As with the flanged pedestal configuration, the Raman redirector element will be located within the vacuum chamber 705 with the flanged cup configuration.

By hard mounting the Raman redirector element to the flanged pedestal (or flanged cup) and brazing the flanged pedestal/cup to the vacuum chamber 705, the entire Raman redirector element assembly is very robust and can tolerate the mechanical vibrations found in a dynamic environment without losing alignment. This is in contrast to prior art Raman redirector elements that employed epoxy to mount the Raman redirector element, which would not withstand the rigors of a dynamic environment. Further, due to outgassing of the epoxy, it was not compatible with the high vacuum levels required for the vacuum chambers, especially if the vacuum chamber uses passive vacuum pumping. In like manner, the epoxy was not compatible with the high temperature employed to bake out the vacuum chamber, especially if the vacuum chamber will use passive vacuum pumping.

Additional Optical Elements

Figure 12:
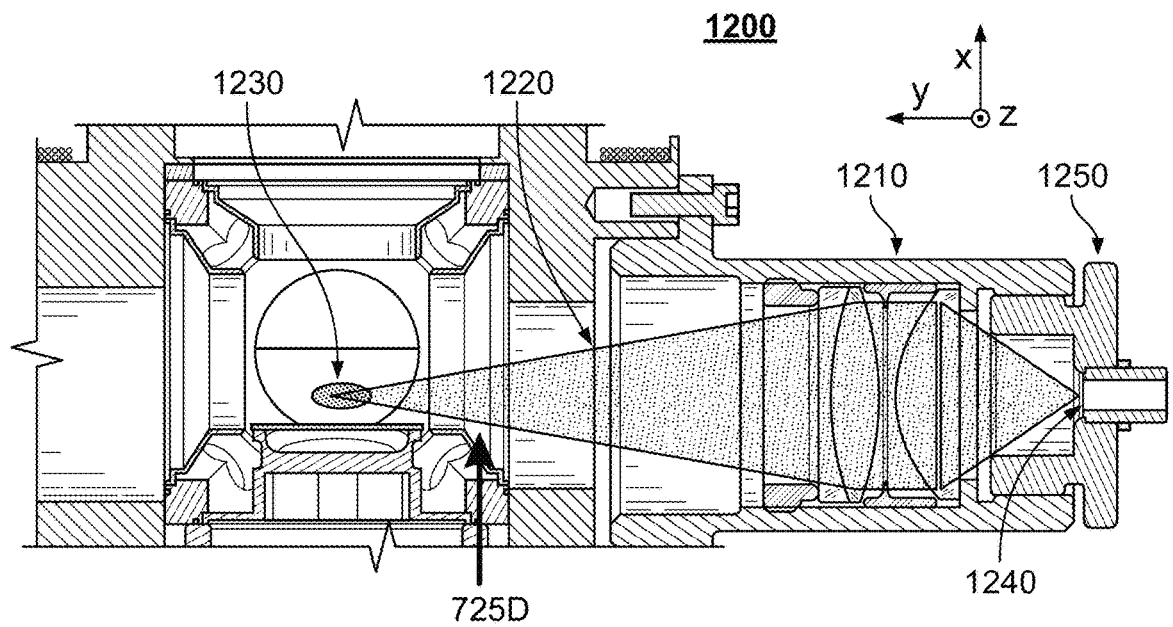
FIG. 12 illustrates the atom detection optics in accordance with one or more embodiments of the present invention.

FIG. 12 illustrates the atom detection optics 1200 in accordance with one or more embodiments. The atom detection optics 1200 includes a lens set 1210 for collecting the atomic fluorescence light 1220 from the atomic cloud 1230 that exits optical port 725D of the vacuum chamber 705. The detection laser beam for the atomic cloud 1230 creates the atomic fluorescence light 1220. The collected atomic fluorescence light 1220 is focused onto the end of a multimode optical fiber 1240 attached to the atom detection optics 1200 via an optical fiber port 1250, with a photodetector (not illustrated) connected to the opposite end of the multimode optical fiber 1240.

In other embodiments, the atom detection optics may be integrated into the compact single-axis LPAI accelerometer sensor head 700 via hard mounting. For example, an atom detection photodetector may be mounted on a flanged pedestal or in a flanged cup using a set of clips, thereby locating the atom detection photodetector within the vacuum chamber. As extraneous light may be present in the vacuum chamber, i.e., light not due to the atomic cloud, a spatial and/or frequency filter may be employed to reduce the noise due to this extraneous light. The spatial and/or frequency filter would be located within the vacuum chamber between the atomic cloud and the atom detection photodetector. Alternatively, the frequency filter could be formed on a surface of the atom detection photodetector. In still other embodiments, the atom detection photodetector may be hard mounted to the exterior side of the optical port 725D, of the vacuum chamber 705 using a set of clips.

By hard mounting the atom detection photodetector to vacuum chamber 705, either internally or externally, the entire atom detection optics assembly is very robust and can tolerate the mechanical vibrations found in a dynamic environment without losing alignment. This is in contrast to prior art atom detection optics, which employed epoxy to mount the atom detection optics, which would not withstand the rigors of a dynamic environment. Further, due to outgassing of the epoxy, it was not compatible with the high vacuum levels required for the vacuum chambers, especially if the vacuum chamber uses passive vacuum pumping. In like manner, the epoxy was not compatible with the high temperature employed to bake out the vacuum chamber, especially if the vacuum chamber will use passive vacuum pumping.

Figure 13:
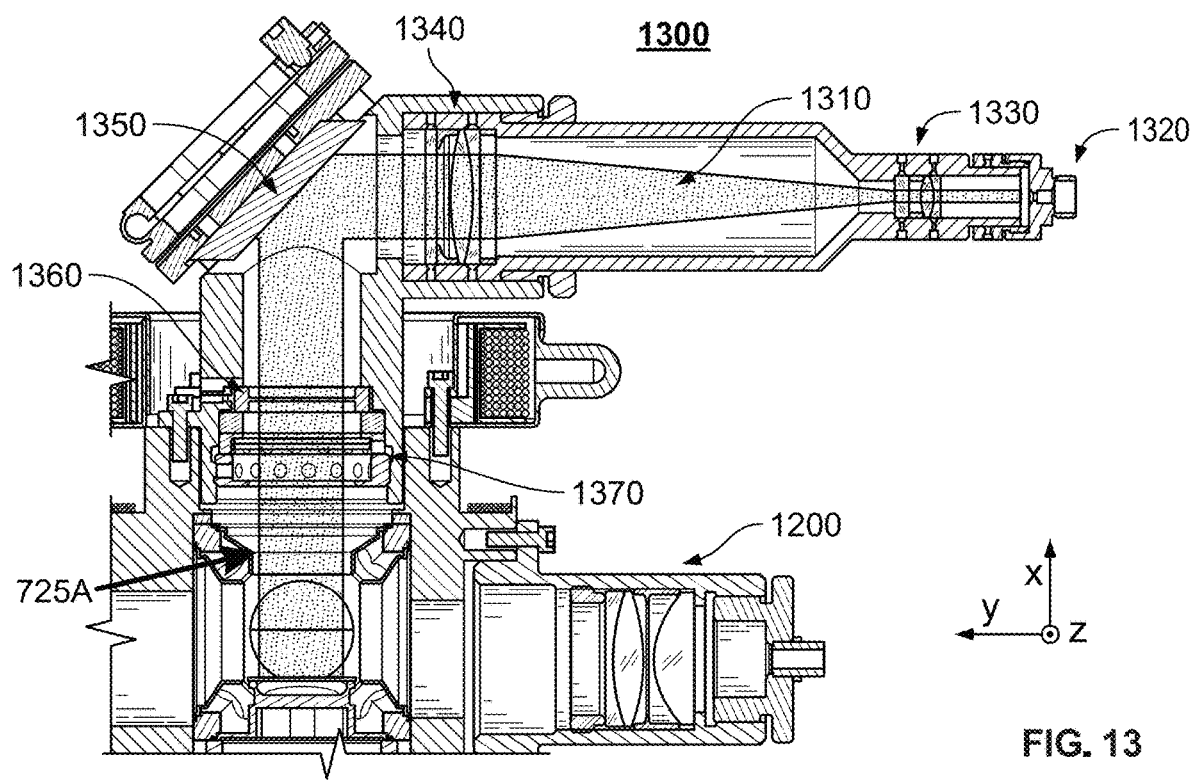
FIG. 13 illustrates the laser cooling beam optics in accordance with one or more embodiments of the present invention.

FIG. 13 illustrates the laser cooling beam optics 1300 in accordance with one or more embodiments of the present invention. To increase the number of atoms in the atomic cloud, the laser cooling beam 1310, annotated with speckles, preferably has a "flat-top" beam profile with approximately uniform radial intensity. This may be achieved in several ways, including with a negative lens, a beam shaper, an apodizing filter, or some combination thereof. The incoming laser cooling beam 1310 is coupled to the laser cooling beam optics 1300 via an optical fiber (not illustrated) coupled to an optical fiber port 1320. The laser cooling beam 1310 expands as it passes through one or more lens sets 1330, 1340 before being redirected 90° by a turning mirror 1350. The lens set 1330 may include, for example, a doublet and an intensity corrector, with the intensity corrector modifying the laser cooling beam 1310 so that its intensity has the desired "flat-top" beam profile, though this process may introduce aberrations to the laser cooling beam 1310. The lens set 1340 may include, for example, a doublet and a phase corrector, with the phase corrector adjusting the wavefront of the expanded laser cooling beam 1310, thereby correcting the aberrations introduced by the intensity corrector. The turning mirror 1350 in some embodiments is fixed, while in other embodiments the turning mirror 1350 is mounted to a tip-tilt mount to facilitate alignment of the laser cooling beam 1310. After the turning mirror 1350, the laser cooling beam 1310 then passes through a linear polarizer 1360 before passing through a quarter-wave plate on a rotatable mount 1370 to thereby impart a circular polarization. After passing through the quarter-wave plate 1370, the laser cooling beam 1310 enters the vacuum chamber 705, via a corresponding optical port 725A.

In various embodiments, more than one reflective grating chip is employed. Thus, the laser cooling beam is split into one or more laser cooling sub-beams, with the number of laser cooling sub-beams equal to the number of reflective grating chips. The splitting of the laser cooling beam into the one or more laser cooling sub-beams may occur before the laser cooling beam is optically processed to achieve approximately uniform radial intensity, i.e., before the one or more laser cooling sub-beams pass through the laser cooling beam optics 1300 illustrated in FIG. 13. This approach requires that the number of laser cooling beam optics 1300 illustrated in FIG. 13 equal the number of reflective grating chips. Alternatively, the splitting of the laser cooling beam into the one or more laser cooling sub-beams may occur after the laser cooling beam is optically processed to achieve approximately uniform radial intensity, i.e., after the laser cooling beam passes through the laser cooling beam optics 1300 illustrated in FIG. 13. This approach requires only one set of the laser cooling beam optics 1300 illustrated in FIG. 13. With either approach, the laser cooling beam may be split into the desired number of laser cooling sub-beams using, for example, one or more beamsplitters.

In yet other embodiments that employ more than one reflective grating chip, one or more optical demultiplexer switches may be used to create the desired number of laser cooling sub-beams. As the one or more optical demultiplexer switches receive a single cooling laser beam, the resultant laser cooling sub-beams will be selected in a time-multiplexed manner. This time multiplexing of the laser cooling sub-beams results in the corresponding atomic clouds likewise being generated in a time-multiplexed manner.

In at least one embodiment, during the AI process, the single laser cooling beam 1310 can be switched to the depump laser beam in a time-multiplexed manner in accordance with FIG. 5 using an SSB frequency modulator, such as that disclosed in U.S. patent application Ser. No. 16/831, 350.

Single and Multi-Axis LPAI Accelerometer Configurations with Simplified Optical Systems In accordance with a first primary embodiment of the present invention, the LPAI accelerometer is a single-axis accelerometer employing a single reflective grating chip in a single vacuum chamber. The first LPAI accelerometer embodiment allows operation at a high data-rate, for example 50 to 300 Hz or more. This embodiment may be physically implemented, for example, in the compact single-axis LPAI accelerometer sensor head 700 described above with reference to FIG. 7, with the sensing axis parallel to the direction of the two Raman laser beams, as illustrated in FIG. 2.

In accordance with a second primary embodiment of the present invention, the LPAI accelerometer is a three-axis accelerometer employing three vacuum chambers, each with a corresponding reflective grating chip. The second embodiment essentially corresponds to three copies of the first LPAI accelerometer embodiment with the three copies configured orthogonal to each other, i.e., each vacuum chamber is aligned with a respective one of the X, Y, and Z axes. This configuration permits high data-rates for acceleration along all three axes.

In accordance with a third primary embodiment of the present invention, the LPAI accelerometer 1400 is again a three-axis accelerometer that employs three reflective grating chips 1410A, 1410B, 1410C, but all three grating chips 1410A, 1410B, 1410C are located within a single vacuum chamber. By using three separate reflective grating chips 1410A, 1410B, 1410C, the data-rates for all three orthogonal directions, X, Y, and Z axes, are high.

Figure 14:
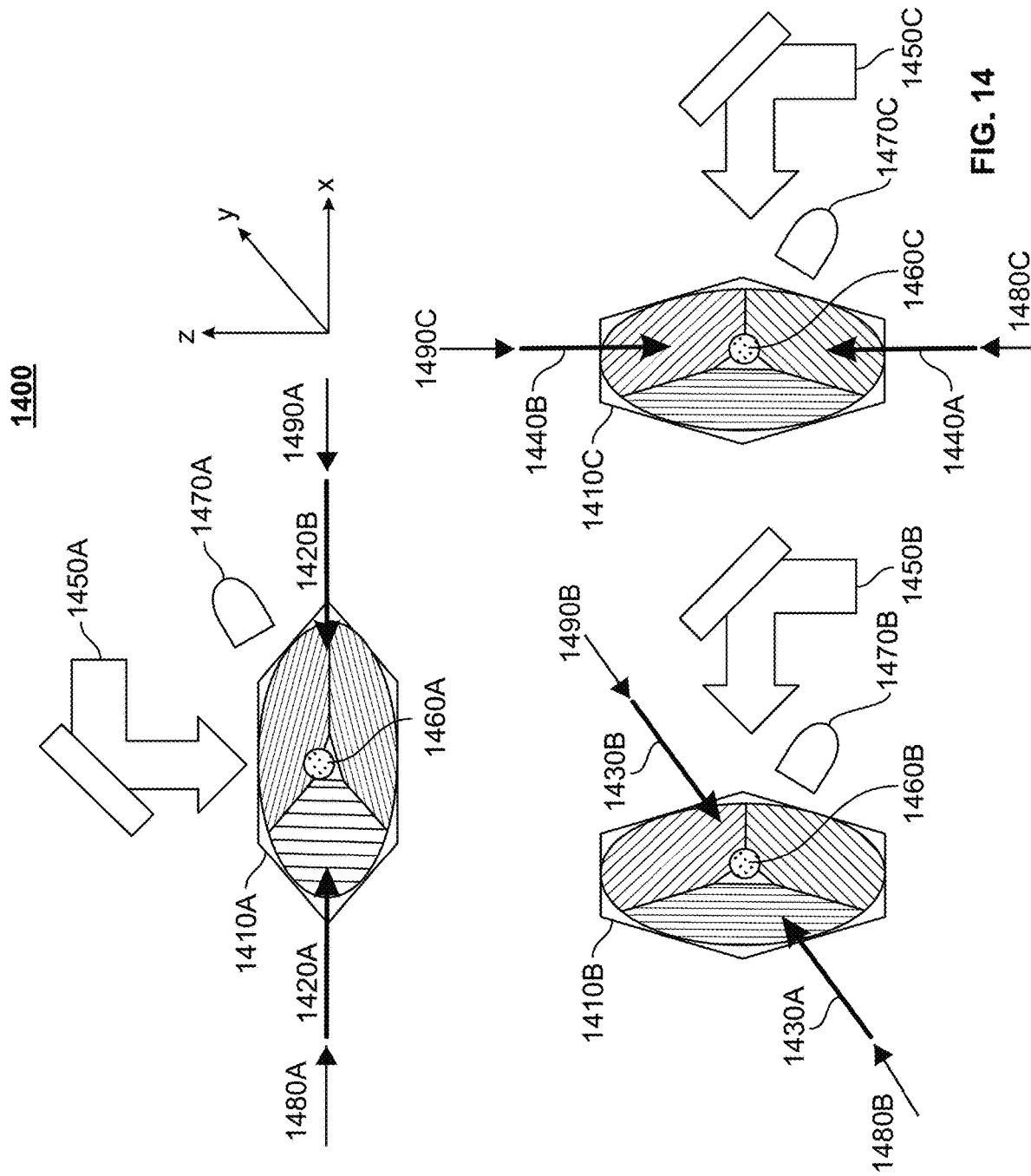
FIG. 14 illustrates the optical system for the single-axis LPAI accelerometer in accordance with one or more embodiments of the present invention.

The vacuum chamber for this three-grating, single-chamber approach will necessarily be more complex than the independent chamber per direction employed in the first and second LPAI accelerometer embodiments. However, as illustrated in FIG. 14, the required optical system need not require three times as many optical fiber tethers relative to the single-axis LPAI accelerometer in accordance with the first embodiment. Specifically, given sufficient power in the pair of Raman laser beams, e.g., approximately three times the power required for the first LPAI accelerometer embodiment, a single Raman laser beam optical fiber tether may supply the Raman laser beams 1420A, 1420B, 1430A, 1430B, 1440A, 1440B needed for all three orthogonal directions using appropriate beamsplitters and corresponding optical elements. In like manner, given sufficient power in the laser cooling beam, a single optical fiber tether may supply the laser cooling sub-beams 1450A, 1450B, 1450C needed to generate the atomic clouds 1460A, 1460B, 1460C for all three orthogonal directions, again using appropriate beamsplitters and corresponding optical elements. (The term "laser cooling sub-beam" refers to a beam that is formed from the laser cooling beam and contains a portion of the power in the originating laser cooling beam. The laser cooling beam may be used to form multiple laser cooling sub-beams, for example, through use of beamsplitter(s) or optical demultiplexer switch(es). In like manner, the launching beam may be split using beamsplitter(s) or optical demultiplexer switch(es) to form multiple launching sub-beams.) Three multimode-fibers would be required for the atom detection portion 1470A, 1470B, 1470C of the AI process for the three orthogonal directions. An LPAI accelerometer needs bidirectional launching beams (1480A or 1490A for X axis sensing, 1480B or 1490B for Y axis sensing, and 1480C or 1490C for Z axis sensing) to provide initial momentum of the atomic cloud along the acceleration sensing direction, i.e., the Raman laser beam axis. The initial momentum of the atomic cloud can be controlled in accordance with a moving platform's linear acceleration measured from a conventional IMU co-sensor, which allows the LPAI acceleration measurement to stay near the atom interference mid-fringe for greater sensitivity. As will be appreciated by one of skill in the art, this just described version of the three-grating, single chamber LPAI three-axis accelerometer embodiment employs simultaneous cooling, Raman, and atom detection among the three orthogonal directions.

In a variation on the three-grating, single chamber LPAI three-axis accelerometer embodiment, the cooling, atom launching, Raman, and atom detection among the three orthogonal directions is potentially time multiplexed. For example, instead of a single optical switch to modulate the pair of Raman laser beams prior to being split three-ways for the three orthogonal directions, three optical switches are employed after the three-way splitting of the incoming Raman laser beams. This three-switch approach would enable the option of simultaneously providing, for example, the first π/2 pulse, to all three atomic clouds. This three-switch approach would also enable the option of providing, for example, the first π/2 pulse to all three atomic clouds in a sequential manner. Similarly, the laser cooling sub-beams could be switched in a simultaneous or sequential manner. This variation would likely require approximately three times the power required for the first LPAI accelerometer embodiment as the switching occurs after the Raman laser beams are split three ways.

In yet another variation on the three-grating, single chamber LPAI three-axis accelerometer embodiment, the cooling, atom launching, Raman, and atom detection among the three orthogonal directions are fully time multiplexed. In this approach, a first optical switch is used to generate the sequence of three Raman pulses, while a second optical demultiplexer switch directs the sequence to the three atomic clouds in the desired order. Note that while the second optical demultiplexer switch directs the sequence to the three atomic clouds, it may be physically implemented as a single three-way demultiplexer switch or as a pair of cascaded two-way demultiplexer switches. This two optical switch configuration would enable directing a first sequence of three Raman pulses to a first atomic cloud, e.g., for sensing X axis acceleration, while directing a second sequence of three Raman pulses to a second atomic cloud, etc., which is termed an atomic cloud sequential approach. This two-switch configuration would also enable directing the first π/2 pulse to each of the three atomic clouds in order, followed by directing the π pulse to each of the three atomic clouds in order, etc., which is termed a Raman pulse sequential approach. This variation would likely require approximately the same power as the first LPAI accelerometer embodiment as the second optical demultiplexer switch directs the Raman laser beams to only one of the three atomic clouds at a time.

Figure 15:
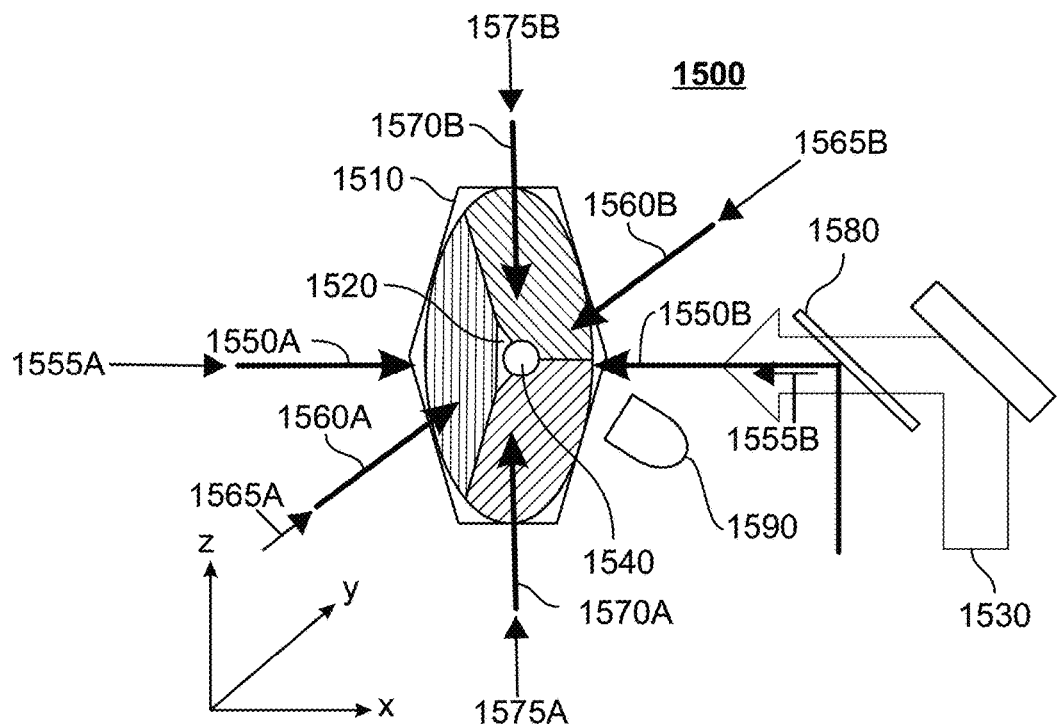
FIG. 15 illustrates a time-multiplexed three-axis LPAI accelerometer that employs a single reflective grating chip in a single vacuum chamber in accordance with one or more embodiments of the present invention.

In accordance with a fourth primary embodiment of the present invention, the LPAI accelerometer is a time-multiplexed three-axis accelerometer that employs a single reflective grating chip in a single vacuum chamber, but has a variable data rate for the three orthogonal axes. FIG. 15 illustrates this single-grating, single chamber LPAI three-axis accelerometer 1500 embodiment. As shown in FIG. 15, the accelerometer 1500 includes a reflective grating chip 1510 with an aperture 1520 in the middle of the reflective grating chip 1510. The accelerometer 1500 employs a cooling laser beam 1530 that, in conjunction with the reflective grating chip 1510, creates an atomic cloud 1540. Acceleration in the three orthogonal directions is measured using three sets of pairs of Raman laser beams, for example, 1550A and 1550B, 1560A and 1560B, and 1570A and 1570B, for the X, Y, and Z sensing axes, respectively. The three sets of pairs of Raman laser beams 1550A, 1550B, 1560A, 1560B, 1570A, 1570B may be created using a beam splitter or an optical demultiplexer switch that receives an original pair of Raman laser beams.

Initial momentum of the atomic cloud in the three orthogonal directions is provided using three sets of bidirectional launching beams, such as 1555A or 1555B, 1565A or 1565B, and 1575A or 1575B for the X, Y, and Z sensing axes, respectively. The three sets of pairs of Raman laser beams 1555A, 1555B, 1565A, 1565B, 1575A, 1575B may be created using a beam splitter or an optical demultiplexer switch that receives an initial pair of Raman laser beams. Depending on the wavelengths of the Raman laser beam 1550B and the cooling laser beam 1530, a beamsplitter (or dichroic mirror) 1580 allows the Raman laser beam 1550B to be combined with the cooling laser beam 1530, so that a single optical port in the vacuum chamber can be used for both. For example, if the Raman laser beam 1550B and the cooling laser beam 1530 use the $D_2$ transition of $^{87}Rb$ atoms (780 nm), a non-polarizing beam splitter (e.g., a 90:10 splitting ratio) may be used to combine the two beams while sacrificing some optical power. However, the power loss can be minimized by using a low optical power for the Raman laser beam 1550B and a high optical power for the Raman laser beam 1550A due to the relationships found in Eq. 1 and Eq. 2 above. As an alternative example, if the Raman laser beam 1550B uses the $D_1$ transition of $^{87}Rb$ atoms (795 nm) and the cooling laser beam 1530 uses the $D_2$ transition of $^{87}Rb$ atoms (780 nm), a dichroic mirror may be used to combine the two beams without sacrificing optical power. An atom detection photodetector 1590, for example, an avalanche photodiode, is used to detect the atomic fluorescence during the atomic state detection portion of the LPAI process.

As the accelerometer 1500 employs only a single atomic cloud 1540, acceleration of the atomic cloud 1540 can only be measured in one direction at a time. To that end, the overall data-rate for the accelerometer 1500 is constant, but the overall data-rate can be distributed among the three orthogonal axes. For example, if the overall data-rate is 300 Hz, this could be split equally among the three orthogonal axes at 100 Hz per axis. Alternatively, if most of the acceleration will be along one of the three axes, the data-rate for that axis can be increased, for example, to 200 Hz for this primary axis, while the other two axes can be dropped to 50 Hz.

As with the third embodiment (three-grating, single chamber LPAI three-axis accelerometer) described above, the optical switching can take several forms. For example, the accelerometer 1500 can employ a single Raman laser beam optical fiber tether and a single cooling laser beam optical fiber tether. The two Raman laser beams from the single Raman laser beam optical fiber tether can be switched to one of the three sensing axes using three optical switches after a three-way splitting of the incoming Raman laser beams. Alternatively, a first optical switch is used to generate the sequence of three Raman pulses, while a second demultiplexer switch directs the sequence to the desired one of the three axes.

In accordance with a fifth primary embodiment of the present invention, the LPAI accelerometer employs an array of accelerometer sensors. The arrayed accelerometer sensors may include, for example, an array of single-axis or three-axis LPAI accelerometers in accordance with any of the first four embodiments. By employing arrayed accelerometer sensors with known separation distances, the accuracy and stability of the system can be improved due to common-mode noise rejection. An array of accelerometer sensors can measure the gradient of acceleration, such as may be required for a gravity gradiometer. Further, an array of accelerometer sensors may provide a higher data rate with zero dead-time operation, which may be useful in systems operating in highly dynamic environments. In addition, system usability increases as the failure of one of the accelerometer sensors will not result in failure of the entire array of accelerometer sensors due to their redundancy.

To the extent a launching beam is employed with the various embodiments of the three-axis LPAI accelerometers, the launching beam may be distributed much like the Raman laser beams and the cooling laser beam using launching beam optics. Specifically, the launching beam optics may employ one or more beam splitters to generate and direct launching sub-beams toward the reflective grating chips. Alternatively, the launching beam optics may employ one or more optical demultiplexer switches to generate and direct launching sub-beams toward the reflective grating chips in a time-multiplexed manner.

Single and Multi-Axis LPAI Gyroscope Configurations with Simplified Optical Systems In accordance with a sixth primary embodiment of the present invention, the LPAI gyroscope is a single-axis gyroscope employing a single reflective grating chip in a single vacuum chamber. The sixth LPAI gyroscope embodiment allows operation at a high data-rate, for example 50 to 300 Hz or more. This embodiment may be physically implemented, for example, in a sensor head similar to the compact single-axis LPAI accelerometer sensor head 700 described above with reference to FIG. 7, with the sensing rotation axis orthogonal to the direction of the two Raman laser beams and the launching beam, as illustrated in FIG. 2.

Figure 16A:
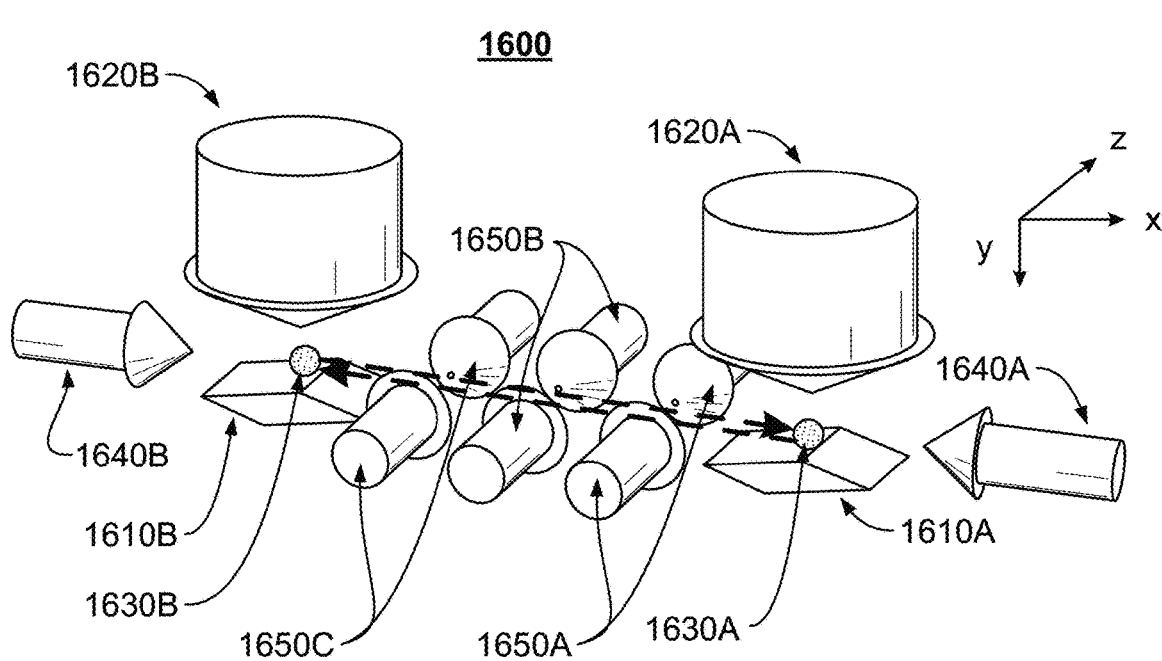
FIGS. 16A and 16B illustrate the single-axis LPAI gyroscope employing a pair of reflective grating chips in accordance with one or more embodiments of the present invention.

In accordance with a seventh primary embodiment of the present invention, the LPAI gyroscope 1600 is a single-axis gyroscope employing a pair of reflective grating chips 1610A, 1610B (lying in the same X-Z plane) in a single vacuum chamber (not illustrated), as illustrated in FIG. 16A. The LPAI gyroscope 1600 employs a corresponding pair of laser cooling sub-beams 1620A, 1620B, that, in conjunction with the pair of reflective grating chips 1610A, 1610B, create a corresponding pair of atomic clouds 1630A, 1630B. Each of the atomic clouds 1630A, 1630B is given an initial momentum using corresponding launching beams 1640A, 1640B delivered by launching beam optics (not illustrated), which launch the atomic clouds 1630A, 1630B toward each other, as indicated by the dashed red lines. The atomic clouds 1630A, 1630B are then subjected to the sequence of three pairs of Raman laser beams 1650A, 1650B, 1650C, generated from an initial pair of parallel-polarized Raman laser beams 1650. Note that while the pairs of Raman laser beams 1650A, 1650C are both $\pi/2$ pulses while the pair of Raman laser beams 1650B is the $\pi$ pulse, the pair of Raman laser beams 1650A will be the first $\pi/2$ pulses for the atomic cloud 1630A, but the second $\pi/2$ pulses for the atomic cloud 1630B, given their respective directions of travel. The measuring axis of rotation is parallel to the laser cooling sub-beams 1620A, 1620B, i.e., the Y axis, with the momentum direction being parallel to the X axis and the pairs of Raman laser beams 1650A, 1650B, 1650C parallel to the Z axis. The three pairs of Raman laser beams 1650A, 1650B, 1650C may be termed a triplet of pairs of Raman laser beams.

The LPAI gyroscope 1600, with its pair of reflective grating chips 1610A, 1610B, provides several benefits over the LPAI gyroscope of the sixth embodiment with only a single reflective grating chip. These benefits include the ability to simultaneously measure both clockwise and counter-clockwise angular velocities about the sensing axis. This differential measurement enables common-mode noise rejection for high sensitivity rotation measurements.

The LPAI gyroscope 1600 may be physically implemented, for example, in many different configurations. Exploring first the laser cooling sub-beams 1620A, 1620B, these may be provided over a single laser cooling beam optical fiber tether, with a beamsplitter. In one variation, the beamsplitter is an optical fiber-based beamsplitter, with the cooling laser beam split two-ways over two laser cooling sub-beam optical fiber sub-tethers, each connected, for example, to a set of laser cooling beam optics 1300 as described above with reference to FIG. 13. In another variation, a single set of laser cooling beam optics 1300 is employed, along with a 50% beamsplitter that directs 50% of the laser cooling beam, i.e., laser cooling sub-beam 1620A, to the first reflective grating chip 1610A, while a mirror directs the remaining 50% of the laser cooling beam, i.e., laser cooling sub-beam 1620B, to the second reflective grating chip 1610B. Using time multiplexing, the laser cooling beam optical fiber tether may also be used to direct the depump and atom detection beams to the atomic clouds 1630A, 1630B.

Similar to the laser cooling sub-beams 1620A, 1620B, the two launching beams 1640A, 1640B that propagate in opposite directions may be provided over a single launching beam optical fiber tether, with a beamsplitter. In one variation, the beamsplitter is an optical fiber-based beamsplitter, with the original launching beam split two-ways and distributed over two launching beam optical fiber sub-tethers, each connected, for example, to a set of launching beam optics located at opposing ends of the vacuum chamber. In another variation, a single set of launching beam optics is employed, along with a 50% beamsplitter that directs 50% of the original launching beam, i.e., launching beam 1640A, to the first atomic cloud 1630A, while one or more mirrors direct the remaining 50% of the original launching beam, i.e., launching beam 1640B, to the second atomic cloud 1630B. Using time multiplexing, the launching beam optical fiber tether may also be used to direct the repump beam or the detection beam to the atomic clouds 1630A, 1630B.

Based upon the initial momentum provided to the two atomic clouds 1630A, 1630B, the physical separation required for the atom interferometry sequence ($\pi/2 \rightarrow \pi \rightarrow \pi/2$) of the triplet of pairs of Raman pulses 1650A, 1650B, 1650C along the X axis direction is known, with the pairs of Raman pulses 1650A, 1650B, 1650C propagating parallel to the Z axis direction. The sequence of the triplet of pairs of Raman pulses 1650A, 1650B, 1650C may be directed to the two atomic clouds 1630A, 1630B in several ways. For example, a single large window in the vacuum chamber may be employed if it is large enough and the initial momentum is not great. Alternatively, three smaller windows into the vacuum chamber may be employed if the initial momentum is too great for the use of a single window.

Figure 16B:
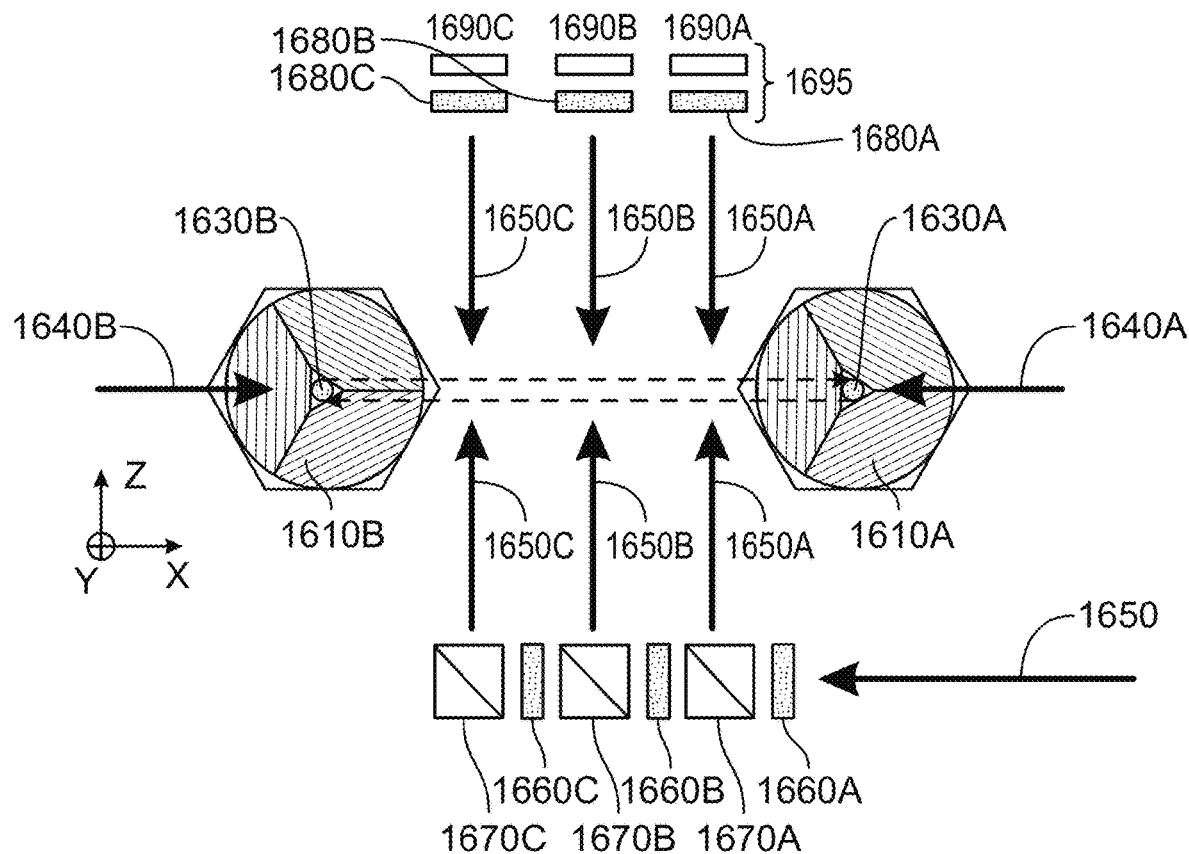

FIG. 16B illustrates a portion of the optical components that may be employed in the LPAI gyroscope 1600 described above with reference to FIG. 16A in at least one embodiment thereof. In particular, FIG. 16B illustrates an example configuration of the optical components that may be used to direct the sequence of the triplet of pairs of Raman pulses 1650A, 1650B, 1650C. The sequence of the triplet of pairs of Raman pulses 1650A, 1650B, 1650C correspond to the counter-propagating, Doppler-sensitive Raman laser beams, having polarization configurations of lin-perp-lin (possible with $\sigma^+\sigma+$ or $\sigma^-\sigma^-$ polarization configuration optics) to transfer the atomic state between two hyperfine-split ground states in addition to a momentum kick, $\hbar k_{eff}$, to one of the ground states, where $k_{eff}$ is an effective wavevector of the Raman laser.

The initial pair of parallel-polarized Raman laser beams 1650 are provided over a Raman laser beam optical fiber tether in the illustrated retro-reflection Raman laser beam configuration with lin-perp-lin polarization. The initial pair of Raman laser beams 1650 are split off by three pairs of half-wave (λ/2) plates 1660A, 1660B, 1660C and corresponding polarizing beamsplitters 1670A, 1670B, 1670C, which balance the optical power of the initial pair of Raman laser beams 1650 of the three spatially separated optical channels as follows. The initial pair of Raman laser beams 1650 passes through the first of the three half-wave (λ/2) plates 1660A, i.e., the first half-wave plate 1660A is optically located immediately before the first polarizing beamsplitter 1670A. A one-third portion of the power of the initial pair of Raman laser beams 1650 is split off by the first polarizing beamsplitter 1670A, thereby creating the pair of Raman laser beams 1650A. Similarly, the remaining portion of the initial pair of Raman laser beams passes through the second half-wave (λ/2) plate 1660B optically located immediately before the second polarizing beamsplitter 1670B. A second, one-third portion of the power of the initial pair of Raman laser beams 1650 is split off by the second polarizing beamsplitter 1670B, thereby creating the pair of Raman laser beams 1650B. The remaining one-third portion of the power of the initial pair of Raman laser beams 1650 passes through the third half-wave (λ/2) plate 1660C optically located immediately before the third polarizing beamsplitter 1670C, and is redirected by the third polarizing beamsplitter 1670C, thereby creating the pair of Raman laser beams 1650C. Each of the triplet of pairs of Raman laser beams 1650A, 1650B, 1650C represent two Raman tones with vertical linear polarization (Y-axis). Each pair of Raman laser beams 1650A, 1650B, 1650C next propagates towards the two atomic clouds 1630A, 1630B launched along the Z axis and is then retro-reflected by the mirrors 1690A, 1690B, 1690C, which redirect the corresponding pairs of Raman laser beams 1650A, 1650B, 1650C with horizontal linear polarization (X-axis) back toward the launched atomic clouds 1630A, 1630B. The combination of a quarter-wave (λ/4) plate 1680A with a corresponding mirror 1690A forms a Raman redirector element 1695, with the three quarter-wave (λ/4) plates 1680A, 1680B, 1680C and three mirrors 1690A, 1690B, 1690C forming a triplet of Raman redirector elements. The two atomic clouds 1630A, 1630B launched in opposite directions interact with the counter-propagating, Doppler-sensitive triplet of pairs of Raman laser beams 1650A, 1650B, 1650C with the polarization configuration of lin-perp-lin according to the timing of the triplet of pairs of Raman laser beams 1650A, 1650B, 1650C and the initial momentum of the atomic clouds 1630A, 1630B. As illustrated in FIG. 16B, the measured axis of rotation is the Y axis.

From a timing standpoint in the atom interferometry pulse sequence (π/2→π→π/2), the first π/2 pulse in the sequence of three Raman pulse pairs will pass through the first atomic cloud 1630A as the pairs of Raman laser beams 1650A and the second atomic cloud 1630B as the pair of Raman laser beams 1650C as the two atomic clouds 1630A, 1630B travel from one end of the vacuum chamber to the other due to their initial momentum. While the first π/2 pulse will create the pair of Raman laser beams 1650B, no atomic cloud is present in the middle of the vacuum chamber. The π pulse in the sequence of three Raman pulse pairs will pass through both atomic clouds 1630A, 1630B as the pair of Raman laser beams 1650B as the two atomic clouds 1630A, 1630B continue to travel from one end of the vacuum chamber to the other due to their initial momentum. While the π pulse will create both the pairs of Raman laser beams 1650A, 1650C, no atomic cloud is present toward either end of the vacuum chamber. Lastly, the second π/2 pulse in the sequence of three Raman pulse pairs will pass through the second atomic cloud 1630B as the pairs of Raman laser beams 1650A and the first atomic cloud 1630A as the pair of Raman laser beams 1650C as the two atomic clouds 1630A, 1630B travel from one end of the vacuum chamber to the other due to their initial momentum. While the second π/2 pulse will create the pair of Raman laser beams 1650B, no atomic cloud is present in the middle of the vacuum chamber.

By employing a pair of reflective grating chips 1610A, 1610B with apertures therethrough, the laser cooling beam optics may also carry the atom detection beams, with the resulting atomic fluorescence signal being sensed by a pair of corresponding atom detection photodetectors. The atom detection photodetectors, for example, avalanche photodiodes, may be installed inside of the vacuum chamber or outside of the vacuum chamber adjacent corresponding optical windows. This scheme utilizes a two-photon detection scheme separating the cooling and repump beams at the photodetector with optical filters. See J. P. McGilligan et al., "Laser cooling in a chip-scale platform," Applied Physics Letters, vol. 117, art. no. 054001 (2020), the contents of which are incorporated herein by reference. The atom detection photodetectors are located on the same side of the reflective grating chips 1610A, 1610B as the laser cooling sub-beams 1620A, 1620B, for example in a manner similar to the atom detection photodetector 1590 discussed above with reference to FIG. 15.

In accordance with an eighth primary embodiment of the present invention, the LPAI gyroscope is a three-axis gyroscope employing three vacuum chambers, each with a corresponding pair of reflective grating chips. The eighth embodiment essentially corresponds to three copies of the seventh LPAI gyroscope embodiment with the three copies configured orthogonal to each other, i.e., each vacuum chamber is aligned with one of the X, Y, and Z axes. This configuration permits high data-rates for rotation about all three axes.

In accordance with a ninth primary embodiment of the present invention, the LPAI gyroscope is again a three-axis gyroscope that employs three pairs of reflective grating chips, but all three pairs of grating chips are located within a single vacuum chamber. By using three separate pairs of reflective grating chips, the data-rates for rotation about all three orthogonal directions, the X, Y, and Z axes, are high.

Figure 17:
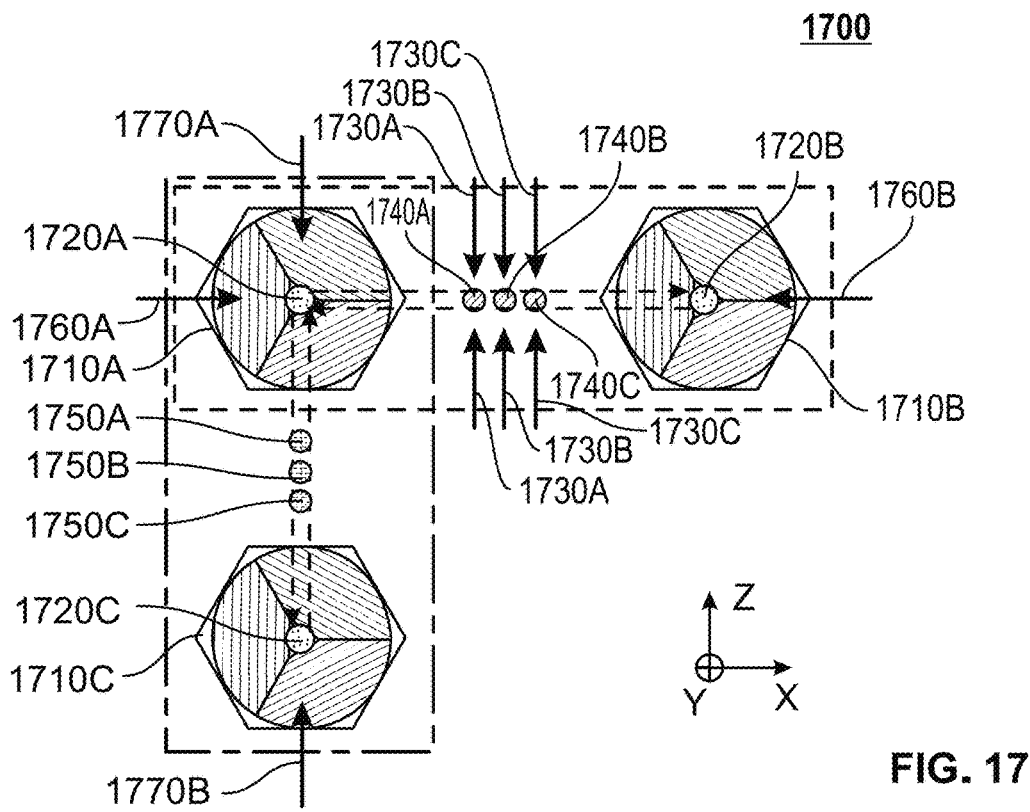
FIG. 17 illustrates a time-multiplexed three-axis LPAI gyroscope employing three reflective grating chips in accordance with one or more embodiments of the present invention.

In accordance with a tenth primary embodiment of the present invention, the LPAI gyroscope is a time-multiplexed three-axis gyroscope that employs three reflective grating chips in a single vacuum chamber, but has a variable data rate for the three orthogonal axes. FIG. 17 illustrates this three-grating, single chamber LPAI three-axis gyroscope 1700 embodiment. As shown in FIG. 17, the gyroscope 1700 includes three reflective grating chips 1710A, 1710B, 1710C, with the three reflective grating chips 1710A, 1710B, 1710C forming a right angle with all three reflective grating chips 1710A, 1710B, 1710C lying in a common plane, i.e., the X-Z plane as illustrated. The gyroscope 1700 employs three atomic clouds 1720A, 1720B, 1720C, generated in conjunction with the three corresponding reflective grating chips 1710A, 1710B, 1710C. The first and second reflective grating chips 1710A, 1710B form a first, single-axis gyroscope, indicated by the horizontal dashed box, with respect to rotation about the Y axis in a manner identical to that of the single-axis gyroscope 1600 described above with reference to FIG. 16. The first, single-axis gyroscope measures rotation about the Y axis as the initial momentum, due to the launching beams 1760A, 1760B, is parallel to the X axis and the triplet of pairs of Raman laser beams 1730A, 1730B, 1730C are parallel to the Z axis. The first and second reflective grating chips 1710A, 1710B also form a second, single-axis gyroscope. The second, single-axis gyroscope measures rotation about the Z axis as the initial momentum, due to the launching beams 1760A, 1760B, is parallel to the X axis and the triplet of pairs of Raman laser beams 1740A, 1740B, 1740C are parallel to the Y axis. The first and third reflective grating chips 1710A, 1710C form a third, single-axis gyroscope, indicated by the vertical dashed box. The third, single-axis gyroscope measures rotation about the X axis as the initial momentum, due to launching beams 1770A, 1770B, is parallel to the Z axis and the triplet of pairs of Raman laser beams 1750A, 1750B, 1750C are parallel to the Y axis.

As the gyroscope 1700 employs the atomic cloud 1720A for measuring rotation about all three axes, the gyroscope 1700 can only measure rotation about one axis at a time. To that end, the overall data-rate for the gyroscope 1700 is constant, but the overall data-rate can be distributed among the three orthogonal rotation axes. For example, if the overall data-rate is 300 Hz, this could be split equally among the three orthogonal rotation axes at 100 Hz per axis. Alternatively, if the majority of the rotation will be around one of the three axes, the data-rate for that rotation axis can be increased, for example, to 200 Hz for this primary rotation axis, while the other two rotation axes can be dropped to 50 Hz.

In accordance with an eleventh primary embodiment of the present invention, the LPAI gyroscope employs arrayed gyroscope sensors. The arrayed gyroscope sensors may include, for example, an array of single-axis or three-axis LPAI gyroscopes in accordance with any of the sixth through tenth embodiments. By employing arrayed gyroscope sensors, the accuracy and stability of the system can be improved through common-mode noise rejection. In addition, the arrayed sensor configuration can measure the gradient of angular velocity. Further, an array of gyroscope sensors may provide a higher data rate with zero dead-time operation, which may be useful in systems operating in highly dynamic environments. In addition, system usability increases as the failure of one of the gyroscope sensors will not result in failure of the entire array of gyroscope sensors due to their redundancy.

Figure 18:
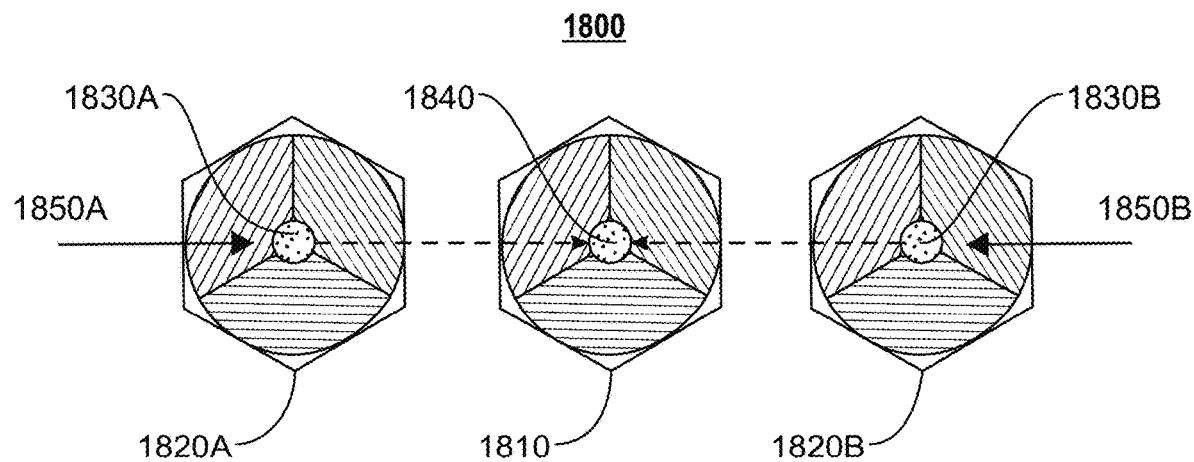
FIG. 18 illustrates the use of multiple reflective grating chips for fast atom loading after sub-Doppler cooling to increase the data rate of the LPAI process in accordance with one or more embodiments of the present invention.

While the above embodiments of the present invention have been described using sequential MOT atom loading and sub-Doppler cooling procedures before starting the atom interferometry operation, a novel method may be employed to increase the data rate using one or more cooling stages to perform fast MOT atom loading, sub-Doppler cooling (~15 μK), and sub-micro-Kelvin cooling procedures during the atom interferometry operation without sacrificing the data rate. As illustrated in FIG. 18, a high data rate LPAI accelerometer 1800 includes a central reflective grating chip 1810 for the LPAI sensing process, along with two cold atom sources, for example, 3D MOT cooling stages with corresponding reflective grating chips 1820A, 1820B. The central grating chip 1810, which operates in a manner similar to the previously described embodiments, does not have to serve the functions of loading the atomic cloud and cooling it during the atom interferometry operation. The atom loading and sub-Doppler cooling functions are implemented by the two 3D MOT cooling stages with reflective grating chips 1820A, 1820B. The two cooling stages with corresponding reflective grating chips 1820A, 1820B operate to create a steady-state MOT, perform sub-Doppler cooling, and execute optional sub-micro-Kelvin cooling schemes, such as free-space Raman cooling, degenerate Raman cooling, and Raman sideband cooling, to further lower the temperature of the atomic clouds 1830A, 1830B. The atomic clouds 1830A, 1830B are launched toward the central reflective grating chip 1810 in an alternating order, where the launched atomic clouds 1830A, 1830B are captured as a central atomic cloud 1840, which is used in the LPAI accelerometer and gyroscope measurement process. The atomic clouds 1830A, 1830B are launched from their respective cooling stage reflective grating chips 1820A, 1820B in an alternating order by respective launching beams 1850A, 1850B, delivered by launching beam optics (not illustrated). While FIG. 18 illustrates two 3D MOT cooling stages, the number of 3D MOT cooling stages as cold atom sources can increase or decrease depending on the target data rate of the LPAI and the required time of atom loading and cooling times.

While the above embodiments of the present invention have been described using sequential MOT atom loading and sub-Doppler cooling procedures before starting the atom interferometry operation in a single 3D MOT chamber, a novel method may be employed to increase the number of MOT atoms and reduce the time of MOT atom loading using a 3D MOT chamber with one or more 2D MOT cooling stages. The 3D MOT chamber is connected to the 2D MOT chamber through a small hole that maintains differential vacuum pressures between the 3D MOT chamber and the 2D MOT chamber. The vacuum pressure of the 2D MOT chamber is high enough to achieve a large number of atoms in a 2D laser cooled atomic beam, but the vacuum pressure of the 3D MOT chamber is low enough to avoid background collisions from vapor atoms and perform the LPAI operation with a long coherence time. In contrast to a 3D MOT cooling stage, a sub-Doppler cooling procedure is required in the 3D MOT chamber after capturing the 2D laser cooled atomic beam from the 2D MOT chamber. The number of 2D MOT chambers connected to a 3D MOT chamber can be increased according to the target atom number of the LPAI and the required time for atom loading. The increased atom number at the beginning of the AI process in the LPAI will improve the signal-to-noise ratio of the AI process.

As discussed above with reference to 3D MOT cooling stages for high data-rate operation, the cooling stages with reflective grating chips 1820A, 1820B operate to create a steady-state MOT, perform sub-Doppler cooling, and optionally execute sub-micro-Kelvin cooling schemes. These optional sub-micro-Kelvin cooling schemes can include: (1) free-space Raman cooling and (2) degenerate Raman sideband cooling, to further lower the temperature of the atomic clouds 1830A, 1830B. Free-space Raman cooling creates sub-micro-Kelvin cold atoms using multiple Raman pulses that are optimally detuned to select a narrow velocity class of atoms by alternatively switching $\vec{k}_{eff}$ of the Raman laser beams. See M. Kasevich and S. Chu, "Laser Cooling below a Photon Recoil with Three-Level Atoms," Physical Review Letters, vol. 69, no. 12, pp. 1741-1744 (1992), the contents of which are incorporated herein by reference. Degenerate Raman sideband cooling requires optical lattices, an optical pump beam, and two-photon Raman laser beams to create sub-micro-Kelvin cold atoms. See V. Vuletic et al., "Degenerate Raman Sideband Cooling of Trapped Cesium Atoms at Very High Atomic Densities," Physical Review Letters, vol. 81, no. 26, pp. 5768-5771 (1998) and A. J. Kerman et al., "Beyond Optical Molasses: 3D Raman Sideband Cooling of Atomic Cesium to High Phase-Space Density," Physical Review Letters, vol. 84, no. 3, pp.

439-442 (2000), the contents of each of which are incorporated herein by reference. Based on time multiplexing frequency modulation schemes, two Raman laser beams can be used to create optical lattices with near-resonant detuning such as 10-20 GHz before starting the atom interferometry operation. An additional optical pump beam and additional two-photon Raman laser beams with well-defined polarizations are required for the sub-micro-Kelvin cooling process of degenerate Raman sideband cooling. These sub-micro-Kelvin cooling processes can be 1D to 3D processes depending upon the number of cooling axes.

While various embodiments of the present invention have been described using optical transfer of the atomic population and atom detection photodetectors to optically sense the atomic fluorescence used to determine the final atomic populations of the states of the atomic clouds, other methods may be employed. For example, instead of using an optical atomic population transfer scheme, microwaves may be used to transfer atomic population within the hyperfine ground state manifolds in some embodiments. Specifically, the microwave fields can be broadcast via a microwave waveguide, for example, a microwave horn, or a microwave antenna. The use of microwave fields provides significant advantages over the use of an optical atomic population transfer scheme, for example, by minimizing the number of optical channels and reducing the complexity of the laser systems. For example, a microwave field with excellent spatial homogeneity provides better atomic coherence relative to that achieved using optical fields, such as co-propagating, Doppler-free Raman laser beams. The corresponding spin flipping of the microwave transition of the atomic cloud, i.e., the AC microwave signal, can be detected through the microwave antenna or the microwave cavity that is installed in the vacuum chamber in the proximity of the atomic cloud. The microwave antenna/cavity may be used to determine the AC microwave signal resonant with the atomic transition frequency corresponding to the energy difference between the two atomic ground states. The strength of this resonance indicates the relative populations of the two atomic ground states.

While the above descriptions have disclosed LPAI accelerometers and gyroscopes having one or three sensing axes, LPAI accelerometers and gyroscopes having two sensing axes may also be implemented based upon the above descriptions. While the above descriptions have disclosed LPAI accelerometers and gyroscopes, various alternative embodiments may also be used to implement a gravimeter, a gravity gradiometer, a magnetometer, an electrometer, or a clock.

Figure 19A:
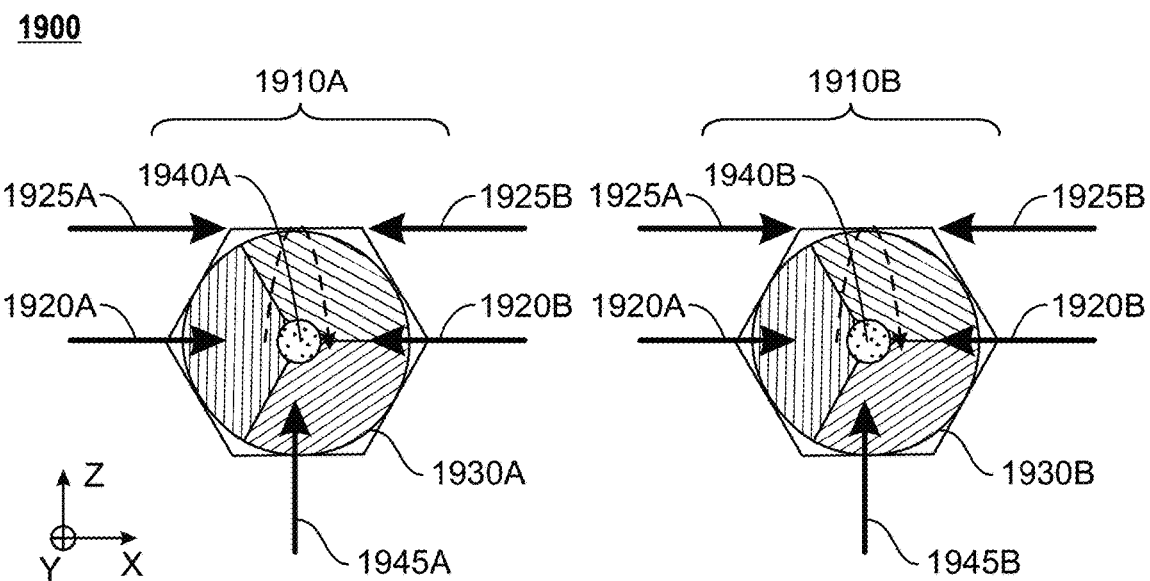
FIGS. 19A and 19B illustrate horizontal and vertical gravity gradiometers, respectively, in accordance with one or more embodiments of the present invention.

For example, and as illustrated in FIG. 19A, one may implement a horizontal gravity gradiometer 1900. The horizontal gravity gradiometer 1900 measures the gravity gradient along a horizontal axis perpendicular to the gravity axis, corresponding to the X direction in FIG. 19A. Two atom interferometers 1910A, 1910B share the same pair of Raman laser beams 1920A, 1920B for the two $\pi/2$ pulses and the same pair of Raman laser beams 1925A, 1925B for the $\pi$ pulse. Each atom interferometer 1910A, 1910B has its own corresponding reflective grating chip 1930A, 1930B, and corresponding atomic cloud 1940A, 1940B. Atoms in the atomic clouds 1940A, 1940B can be initially launched via launching beams 1945A, 1945B against the gravity direction, corresponding to the +Z direction in FIG. 19A, thereby creating what is known as the atomic fountain configuration. In the atom interferometry pulse sequence of $x/2 \to \pi \to \pi/2$, the two $\pi/2$ pulses 1920A, 1920B work on atoms at the lowest position, while the $\pi$ pulse 1925A, 1925B works on atoms at the highest position of atoms. See, J. M. McGuirk et al., "Sensitive absolute-gravity gradiometry using atom interferometry," Physical Review A, vol. 65, art. no. 033608 (2002); J. B. Fixler et al., "Atom Interferometer Measurement of the Newtonian Constant of Gravity," Science, vol. 315, pp. 74-77 (2007); and G. W. Biedermann et al., "Testing gravity with cold-atom interferometers," Physical Review A, vol. 91, art. no. 033629 (2015), the contents of each of which are incorporated herein by reference.

Figure 19B:
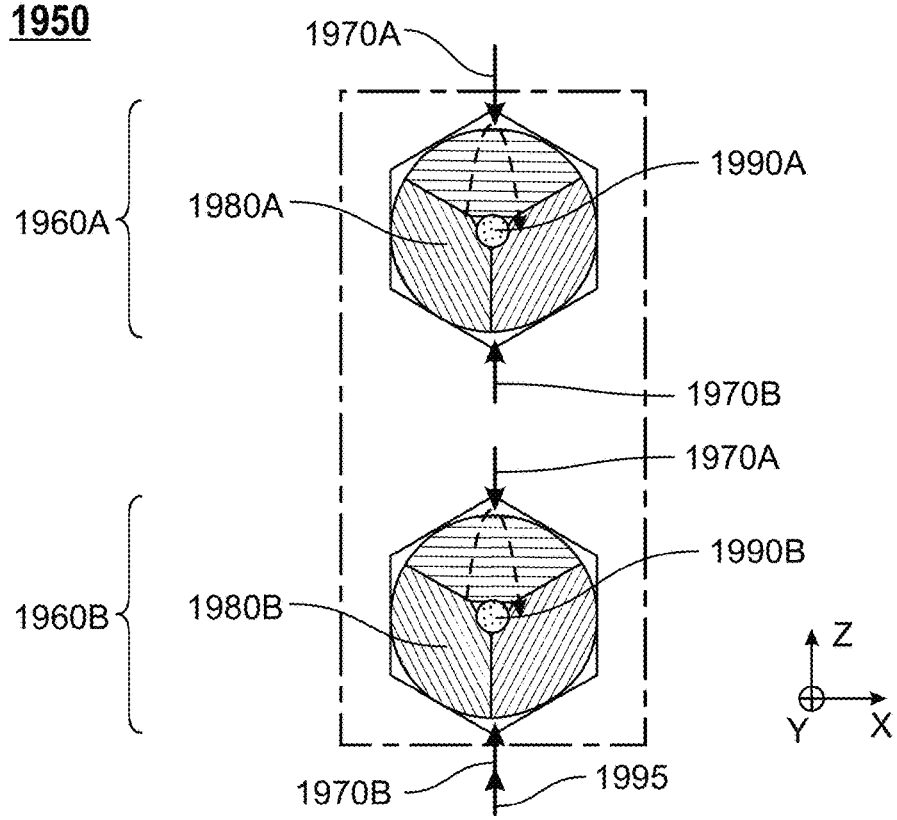

As another example, and as illustrated in FIG. 19B, one may implement a vertical gravity gradiometer 1950. The vertical gravity gradiometer 1950 measures the gravity gradient along a vertical axis parallel to the gravity axis, corresponding to the Z direction in FIG. 19B. Two atom interferometers 1960A, 1960B share the same pair of Raman laser beams 1970A, 1970B. Each atom interferometer 1960A, 1960B has its own corresponding reflective grating chip 1980A, 1980B, and corresponding atomic cloud 1990A, 1990B. Atoms in the atomic clouds 1990A, 1990B can be initially launched via a launching beam 1995 to Raman laser beam 1970B against the gravity direction, corresponding to the +Z direction in FIG. 19B, again creating the atomic fountain configuration. In the atom interferometry pulse sequence of $\pi/2 \to \pi \to \pi/2$, the two $\pi/2$ pulses work on atoms at the lowest position, while the $\pi$ pulse works on atoms at the highest position of atoms.

Figure 20:
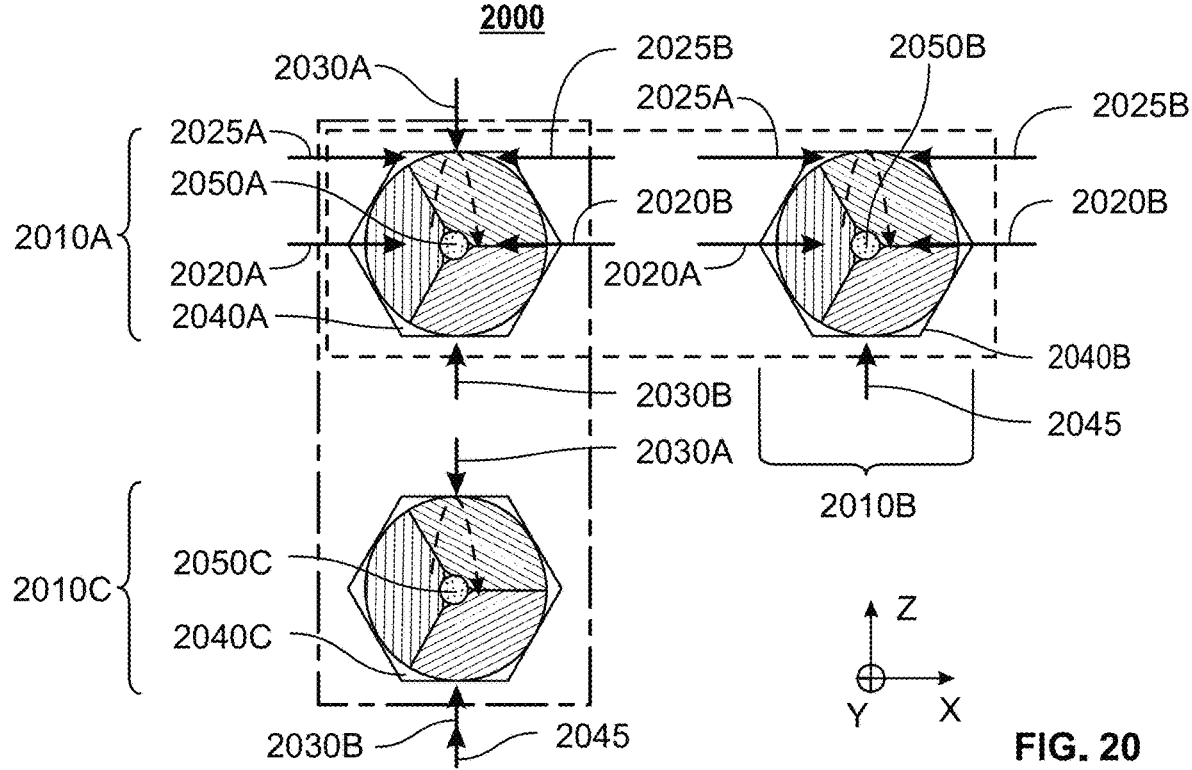
FIG. 20 illustrates a time-multiplexed hybrid gravity gradiometer in accordance with one or more embodiments of the present invention.

As yet another example, and as illustrated in FIG. 20, one may implement a hybrid gravity gradiometer 2000, which is essentially the combination of a horizontal gravity gradiometer 1900 and a vertical gravity gradiometer 1950. The hybrid gravity gradiometer 2000 measures the gravity gradient along a vertical axis parallel to the gravity axis, corresponding to the Z direction in FIG. 20, but does so in a time-multiplexed manner using the two horizontal interferometers 2010A, 2010B followed by the two vertical interferometers 2010A, 2010C. Two atom interferometers 2010A, 2010B, share the same pair of Raman laser beams 2020A, 2020B for two $\pi/2$ pulses and the same pair of Raman laser beams 2025A, 2025B for a $\pi$ pulse, while the two interferometers 2010A, 2010C share the same pair of Raman laser beams 2030A, 2030B. Each atom interferometer 2010A, 2010B, 2010C has its own corresponding reflective grating chip 2040A, 2040B, 2040C, and corresponding atomic cloud 2050A, 2050B, 2050C. Atoms in the atomic clouds 2050A, 2050B, 2050C can be initially launched via launching beams 2045 parallel to Raman laser beam 2030B against the gravity direction, corresponding to the +Z direction in FIG. 20, again creating the atomic fountain configuration. In the atom interferometry pulse sequence of $\pi/2 \to \pi \to \pi/2$, the two $\pi/2$ pulses work on atoms at the lowest position, while the $\pi$ pulse works on atoms at the highest position of atoms. Analogous to the X-axis horizontal gravity gradiometer made of the two atom interferometer 2010A and 2010B, a Y-axis horizontal gravity gradiometer can also be configured with two additional grating chips. Then, it is possible to demonstrate a 3-axis gravity gradiometer. The hybrid gravity gradiometer 2000 offers several benefits over either the horizontal gravity gradiometer 1900 or the vertical gravity gradiometer 1950. These benefits of a 2-axis or 3-axis gravity gradiometer include the simultaneous measurement of horizontal and vertical gravity gradients, which can provide the precise gravitational-map-matching as an inertial navigation aiding solution for GPS-denied and RF contested environments.

The invention may be embodied in other specific forms without departing from its spirit or essential characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An optical system comprising:
   laser cooling beam optics, the laser cooling beam optics adapted to receive a laser cooling beam and to generate at least one laser cooling sub-beam, the laser cooling beam optics including at least one reflective grating chip, the laser cooling beam optics adapted to direct each laser cooling sub-beam toward a corresponding reflective grating chip, each reflective grating chip adapted to diffract a corresponding laser cooling sub-beam into a corresponding plurality of diffracted laser cooling beams;
   Raman combining optics, the Raman combining optics adapted to receive a pair of Raman laser beams and to combine the pair of Raman laser beams, thereby forming a combined pair of cross-polarized Raman laser beams;
   Raman separating optics, the Raman separating optics adapted to receive the combined pair of cross-polarized Raman laser beams and to separate the combined pair of cross-polarized Raman laser beams into at least one pair of first and second Raman laser beams according to optical polarization; and
   at least one Raman redirector element, each Raman redirector element adapted to receive a corresponding pair of first and second Raman laser beams and to direct a corresponding pair of first and second Raman laser beams such that a corresponding pair of first and second Raman laser beams are overlapping and counter-propagating through a corresponding atomic cloud.

2. The optical system of claim 1, wherein the laser cooling beam optics includes at least one beamsplitter, the at least one beamsplitter adapted to receive the laser cooling beam and to separate the laser cooling beam into at least two laser cooling sub-beams, the laser cooling beam optics adapted to direct each laser cooling sub-beam to a corresponding reflective grating chip.

3. The optical system of claim 1, wherein the laser cooling beam optics includes at least one optical demultiplexer switch, the at least one optical demultiplexer switch adapted to receive the laser cooling beam and to separate the laser cooling beam into at least two laser cooling sub-beams in a time-multiplexed manner, the laser cooling beam optics adapted to direct a respective one of the at least two laser cooling sub-beams to a corresponding one of the one or more reflective grating chips in a time-multiplexed manner.

4. The optical system of claim 1, wherein the Raman combining optics include:
   a polarizing beam splitter, the polarizing beam splitter adapted to receive the pair of Raman laser beams and to combine the pair of Raman lasers beams to thereby form the combined pair of cross-polarized Raman laser beams;
   a Raman laser beam switch, the Raman laser beam switch adapted to receive the combined pair of cross-polarized Raman laser beams and to simultaneously switch the combined pair of cross-polarized Raman laser beams to thereby form a sequence of three Raman pulses, pulses in the sequence of three Raman pulses adapted to split, redirect, and re-combine atomic wavepackets of the atomic cloud, respectively; and
   a Raman laser beam output port, the Raman laser beam output port adapted to receive the thus switched combined pair of cross-polarized Raman laser beams and to direct the thus switched combined pair of cross-polarized Raman laser beams to the Raman separating optics.

5. The optical system of claim 1, wherein the Raman separating optics include:
   a first polarizing beam splitter, the first polarizing beam splitter adapted to receive and to separate the combined pair of cross-polarized Raman laser beams into the pair of first and second Raman laser beams according to optical polarization, the first polarizing beam splitter adapted to direct the second Raman laser beam to the Raman directing optics and to redirect the first Raman laser beam; and
   a second polarizing beam splitter, the second polarizing beam splitter adapted to receive and to redirect the first Raman laser beam.

6. The optical system of claim 1,
   wherein the Raman separating optics include a beamsplitter or an optical demultiplexer switch, the beamsplitter or the optical demultiplexer switch adapted to receive the combined pair of cross-polarized Raman laser beams and to separate the combined pair of cross-polarized Raman laser beams into at least two sets of combined pairs of cross-polarized Raman laser beams for multi-axis sensing;
   wherein the Raman separating optics are adapted to direct each set of combined pairs of cross-polarized Raman laser beams such that a direction of each set of combined pairs of cross-polarized Raman laser beams is orthogonal to a direction of each other of the sets of combined pairs of cross-polarized Raman laser beams for multi-axis sensing.

7. The optical system of claim 6, wherein the optical demultiplexer switch is adapted to generate the at least two sets of combined pairs of cross-polarized Raman laser beams in a time-multiplexed manner.

8. The optical system of claim 1,
   wherein the Raman combining optics are further adapted to receive a launching beam;
   wherein the Raman separating optics further include launching beam optics, the launching beam optics adapted to receive the launching beam, to separate the launching beam into at least one launching sub-beam, and to direct each launching sub-beam such that a direction of the launching sub-beam is parallel to a direction of a corresponding pair of first and second Raman laser beams, each launching sub-beam adapted to deliver an initial momentum to atoms in a corresponding atomic cloud; and
   wherein the optical system is adapted to implement one of an accelerometer, a gravimeter in an atomic fountain configuration, or a gravity gradiometer in an atomic fountain configuration.

9. The optical system of claim 8, the launching beam optics including at least one optical demultiplexer switch, the at least one optical demultiplexer switch adapted to receive the launching beam and to separate the launching beam into at least two launching sub-beams in a time-multiplexed manner.

10. The optical system of claim 1,
    wherein the optical system is adapted to implement one of an accelerometer, a gravimeter, or a gravity gradiometer; and wherein the optical system is adapted to include one of a single sensing axis, two sensing axes, or three sensing axes.

11. An optical system comprising:
laser cooling beam optics, the laser cooling beam optics adapted to receive a laser cooling beam and to generate at least two laser cooling sub-beams, the laser cooling beam optics including at least two reflective grating chips, the at least two reflective grating chips lying in a common plane, the laser cooling beam optics adapted to direct each laser cooling sub-beam toward a corresponding reflective grating chip, each reflective grating chip adapted to diffract a corresponding laser cooling sub-beam into a corresponding plurality of diffracted laser cooling beams;
Raman combining optics, the Raman combining optics adapted to receive a pair of Raman laser beams and to combine the pair of Raman laser beams, thereby forming a combined pair of parallel-polarized Raman laser beams;
Raman separating optics, the Raman separating optics adapted to receive the combined pair of parallel-polarized Raman laser beams and to separate the combined pair of parallel-polarized Raman laser beams into at least one triplet of first, second, and third pairs of Raman laser beams;
at least one triplet of first, second, and third Raman redirector elements, each Raman redirector element adapted to receive a corresponding pair of Raman laser beams and to direct a corresponding pair of Raman laser beams such that a corresponding pair of Raman laser beams are overlapping and counter-propagating through an atomic cloud; and
launching beam optics, the launching beam optics adapted to receive a launching beam, to separate the launching beam into at least one pair of launching sub-beams, a direction of a first launching sub-beam in each pair of launching sub-beams opposite a direction of a second launching sub-beam in each pair of launching sub-beams, and to direct each launching sub-beam such that a direction of each launching sub-beam is orthogonal to a direction of a corresponding triplet of first, second, and third pairs of Raman laser beams, each launching sub-beam adapted to deliver an initial momentum to atoms in a corresponding atomic cloud.

12. The optical system of claim 11, wherein the first launching sub-beam and the second launching sub-beam in each pair of launching sub-beams are adapted to operate in a time-multiplexed manner or simultaneously.

13. The optical system of claim 11, wherein the Raman combining optics include:
a polarizing beam splitter, the polarizing beam splitter adapted to receive the pair of Raman laser beams and to combine the pair of Raman lasers beams to thereby form the combined pair of parallel-polarized Raman laser beams;
a Raman laser beam switch, the Raman laser beam switch adapted to receive the combined pair of parallel-polarized Raman laser beams and to simultaneously switch the combined pair of parallel-polarized Raman laser beams to thereby form a sequence of three Raman pulses, pulses in the sequence of three Raman pulses adapted to split, redirect, and re-combine atomic wave-packets of the atomic cloud, respectively; and
a Raman laser beam output port, the Raman laser beam output port adapted to receive the thus switched combined pair of parallel-polarized Raman laser beams and to direct the thus switched combined pair of parallel-polarized Raman laser beams to the Raman separating optics.

14. The optical system of claim 11, wherein the Raman separating optics include:
a first polarizing beamsplitter, the first polarizing beamsplitter adapted to receive the combined pair of parallel-polarized Raman laser beams, to split off a first portion of the combined pair of parallel-polarized Raman laser beams as the first pair of Raman laser beams, to redirect the first pair of Raman laser beams, and to pass a first remaining portion of the combined pair of parallel-polarized Raman laser beams;
a second polarizing beamsplitter, the second polarizing beamsplitter adapted to receive the first remaining portion of the combined pair of parallel-polarized Raman laser beams, to split off a second portion of the first remaining portion of the combined pair of parallel-polarized Raman laser beams as the second pair of Raman laser beams, to redirect the second pair of Raman laser beams, and to pass a second remaining portion of the combined pair of parallel-polarized Raman laser beams; and
a third polarizing beamsplitter, the third polarizing beamsplitter adapted to receive the second remaining portion of the combined pair of parallel-polarized Raman laser beams and to redirect the second remaining portion of the combined pair of parallel-polarized Raman laser beams as the third pair of Raman laser beams.

15. The optical system of claim 14, wherein the Raman separating optics further include three half-wave plates, each half-wave plate optically located immediately before a corresponding polarizing beamsplitter.

16. The optical system of claim 11,
wherein the Raman separating optics include a beamsplitter or an optical demultiplexer switch, the beamsplitter or optical demultiplexer switch adapted to receive the combined pair of parallel-polarized Raman laser beams and to separate the combined pair of parallel-polarized Raman laser beams into at least two sets of combined pairs of parallel-polarized Raman laser beams for multi-axis sensing; and
wherein the Raman separating optics are adapted to direct each set of combined pairs of parallel-polarized Raman laser beams such that a direction of each set of combined pairs of parallel-polarized Raman laser beams is orthogonal to a direction of each other of the sets of combined pairs of parallel-polarized Raman laser beams for multi-axis sensing.

17. The optical system of claim 16, wherein the optical demultiplexer switch is adapted to generate the at least two sets of combined pairs of parallel-polarized Raman laser beams in a time-multiplexed manner.

18. The optical system of claim 11, wherein each Raman redirector element includes:
a quarter-wave plate, the quarter-wave plate adapted to receive and to transmit a corresponding pair of Raman laser beams; and
a mirror, the mirror adapted to receive and to reflect a corresponding pair of Raman laser beams.

19. The optical system of claim 11,
wherein the at least two laser cooling sub-beams is three laser cooling sub-beams;
wherein the at least two reflective grating chips is first, second, and third reflective grating chips, a direction from the first reflective grating chip to the second reflective grating chip being orthogonal to a direction from the first reflective grating chip to the third reflective grating chip;

wherein the at least one triplet of first, second, and third pairs of Raman laser beams is three triplets of corresponding first, second, and third pairs of Raman laser beams;

wherein the at least one triplet of first, second, and third Raman redirector elements is three triplets of corresponding first, second, and third Raman redirector elements;

wherein the at least one pair of launching sub-beams is first and second pairs of launching sub-beams, a direction of the first pair of launching sub-beams being orthogonal to a direction of the second pair of launching sub-beams; and wherein the optical system is adapted to implement a three-axis gyroscope in a time-multiplexed manner.

20. The optical system of claim 11, wherein the optical system is adapted to implement a gyroscope; and wherein the optical system is adapted to include one of a single sensing axis, two sensing axes, or three sensing axes.

* * * * *